(12) United States Patent
Kojima et al.

(10) Patent No.: US 8,421,670 B2
(45) Date of Patent: Apr. 16, 2013

(54) POSITION ESTIMATION APPARATUS AND COMPUTER READABLE MEDIUM STORING POSITION ESTIMATION PROGRAM

(75) Inventors: Yoshiko Kojima, Nagoya (JP); Junichi Meguro, Nagoya (JP); Noriyoshi Suzuki, Nagoya (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 142 days.

(21) Appl. No.: 13/044,030

(22) Filed: Mar. 9, 2011

(65) Prior Publication Data

US 2011/0235686 A1    Sep. 29, 2011

(30) Foreign Application Priority Data

Mar. 10, 2010   (JP) ................................. 2010-053139
Dec. 20, 2010   (JP) ................................. 2010-283675

(51) Int. Cl.
G01S 19/42      (2010.01)
G01S 5/10       (2006.01)

(52) U.S. Cl.
USPC ................................ 342/357.25; 342/357.78

(58) Field of Classification Search ............ 342/357.25, 342/357.4, 357.63, 357.78; 701/468; 375/141, 375/E1.002
See application file for complete search history.

(56) References Cited

U.S. PATENT DOCUMENTS

2010/0328146 A1*   12/2010  Xie et al. ................. 342/357.25
2011/0169689 A1*   7/2011   Wang et al. ............... 342/357.3

FOREIGN PATENT DOCUMENTS

| JP | A-4-121618   | 4/1992  |
| JP | A-5-333132   | 12/1993 |
| JP | A-9-280877   | 10/1997 |
| JP | A-2004-69536 | 3/2004  |
| JP | A-2006-208392| 8/2006  |

OTHER PUBLICATIONS

Masa et al., Global Positioning System (GPS): Signals, Measurements, and Performance, Japan Institute of Navigation, GPS Panel, 2004, pp. 82-91 (with translation).

* cited by examiner

*Primary Examiner* — Dao Phan
(74) *Attorney, Agent, or Firm* — Oliff & Berridge, PLC

(57) ABSTRACT

The present invention provides a position estimation apparatus, mounted at mobile object, including: an acquisition section that acquires transmission source information transmitted from each plural information transmission sources including, information relating to a position of information transmission source, information relating to a distance between information transmission source and mobile object, and information relating to a relative velocity of mobile object with respect to information transmission sources; a trajectory calculation section that calculates, over predetermined duration, a trajectory of mobile object by integrating velocity vectors of mobile object obtained based on transmission source information; and an estimation section that estimates, as a position of mobile object, a position for which trajectory is translated such that a difference between, distances between a plurality of points at different times on trajectory and respective information transmission sources, and acquired distances between respective information transmission sources and mobile object, is minimum.

12 Claims, 19 Drawing Sheets

POSITION ESTIMATION APPARATUS AND COMPUTER READABLE MEDIUM STORING POSITION ESTIMATION PROGRAM

CROSS-REFERENCE TO RELATED APPLICATION

This application claims priority under 35 USC 119 from Japanese Patent Application No. 2010-053139 filed on Mar. 10, 2010 and No. 2010-283675 filed on Dec. 20, 2010, the disclosure of which is incorporated by reference herein.

BACKGROUND

1. Technical Field

The present invention relates to a position estimation apparatus and a computer readable medium storing a position estimation program. In particular, the present invention relates to a position estimation apparatus and a computer readable medium storing a position estimation program for estimating the position of a mobile object.

2. Related Art

Heretofore, a mobile object positioning device that finds a navigation position of a mobile object from a plural pseudo-ranges from navigation satellites, a positioning navigation section, an inertial navigation section and a Kalman filter, has been proposed (see Japanese Patent Application Laid-Open (JP-A) No. 2006-208392). The mobile object positioning device described in JP-A No. 2006-208392, obtains estimated Doppler values by calculating relative velocities of the mobile object with respect to the navigation satellites from, measured Doppler values between the navigation satellites and the mobile object, a navigation almanac, and output of the Kalman filter. Further, the mobile object positioning device also includes a satellite information selection section, which outputs selected pseudo-ranges from among the plural pseudo-ranges, and a pseudo-range estimation section, which computes and outputs estimated pseudo-range values from carrier wave phase information obtained from the navigation satellites, the selected pseudo-ranges, and output of the Kalman filter. Further, the positioning navigation section inputs the estimated pseudo-range values, and outputs positioning navigation velocities and positioning navigation positions. The Kalman filter finds estimated status values from estimated pseudo-range values, the output of the position navigation section, and output of the inertial navigation system.

However, in the above technology described in JP-A No. 2006-208392, a movement direction of the mobile object may not be estimated by the inertial navigation section estimating the trajectory of the mobile object. Therefore, with this technology, it is necessary to estimate the direction when synthesizing information with the positioning navigation section. Furthermore, the positioning navigation section only inputs pseudo-ranges for estimating positions. Therefore, errors occur at epoch intervals and accuracy of the position estimation is inconsistent.

SUMMARY

The present invention provides a position estimation apparatus and a computer readable medium storing a position estimation program, that accurately estimate positions of a mobile object.

A first aspect of the present invention is a position estimation apparatus mounted at a mobile object, the position estimation apparatus including: an acquisition section that acquires transmission source information transmitted from each of a plurality of information transmission sources, the transmission source information including information relating to a position of the each information transmission source, information relating to a distance between the each information transmission source and the mobile object, and information relating to a relative velocity of the mobile object with respect to the each information transmission source; a trajectory calculation section that calculates a trajectory of the mobile object by integrating velocity vectors of the mobile object over a predetermined duration, the velocity vectors of the mobile object being obtained on the basis of the transmission source information acquired by the acquisition section; and an estimation section that estimates, as a position of the mobile object, a position for which the trajectory of the mobile object calculated by the trajectory calculation section is translated such that a difference between distances between a plurality of points at different times on the trajectory of the mobile object and the respective information transmission sources and the acquired distances between the respective information transmission sources and the mobile object is at a minimum.

According to the position estimation apparatus of the present invention, the acquisition section acquires the transmission source information that is transmitted from each of the plural information transmission sources, including information relating to respective positions of the information transmission sources, information relating to distances between the respective information transmission sources and the mobile object, and information relating to relative velocities of the mobile object with respect to the respective information transmission sources. The trajectory calculation section calculates a trajectory of the mobile object by integrating velocity vectors of the mobile object over a predetermined duration, on the basis of the transmission source information acquired by the acquisition section. The term "integrating over a predetermined duration" used herein, is intended to integrating over durations with ranges suitable for providing a required accuracy. The trajectory of the mobile object calculated by integrating the velocity vectors may be accurately calculated in shapes and orientations thereof, and the positions represented by the trajectory of the mobile object have a translational relationship with the absolute positions.

Hence, the estimation section estimates a position to which the trajectory of the mobile object is translated, so as to minimize differences between, distances from plural points at different time points on the trajectory of the mobile object calculated by the trajectory calculation section to the respective information transmission sources, and the acquired distances from the respective information transmission sources to the mobile object, to be the position of the mobile object.

Thus, the first aspect of the present invention couples the acquired information relating to the distances between the respective information transmission sources and the mobile object, by reference to the trajectory of the mobile object with a highly accurate shape and orientation, that is calculated from the velocity vectors of the mobile object, translates the trajectory of the mobile object to an optimum position, and estimates the position of the mobile object. Therefore, the first aspect of the present invention may estimate positions of the mobile object accurately.

The trajectory calculation section calculates respective directions of the information transmission sources from the mobile object, on the basis of the information relating to the respective positions of the information transmission sources and a position of the mobile object obtained from the information relating to distances between the respective information transmission sources and the mobile object. Further, the trajectory calculation section then calculates respective velocities of the information transmission sources on the basis of time series of the information relating to the respective positions of the information transmission sources. Further, the trajectory calculation section calculates velocities of the mobile object in the respective directions of the information transmission sources on the basis of the information relating to the respective directions of the information transmission sources from the mobile object, the respective velocities of the information transmission sources, and the relative velocities of the mobile object with respect to the respective information transmission sources. Furthermore, the trajectory calculation section then calculates a velocity vector of the mobile object on the basis of the plural velocities of the mobile object in the respective directions of the information transmission sources.

The information transmission sources may be GPS (global positioning system) satellites. GPS satellites transmit satellite navigation information, which serves as the information relating to the respective positions of the information transmission sources, pseudo-range information, which serves as the information relating to the distances between the mobile object and the respective information transmission sources, and Doppler shift frequency information, which serves as the information relating to the velocities of the mobile object with respect to the respective information transmission sources. It is sufficient that the information transmission sources be sources that transmit transmission source information, for example, pseudo-satellites, beacons and the like, but the information transmission sources may typically be GPS satellites.

The trajectory calculation section calculates the velocity vectors of the mobile object on the basis of the transmission source information that is acquired by the acquisition section, and mobile object movement information that is detected by a detection section that detects movements of the mobile object. Accordingly, the first aspect of the present invention may accurately estimate the position of the mobile object even if the number of sets of transmission source information acquired from the information transmission sources is insufficient. Moreover, because the first aspect of the present invention couples the transmission source information with the mobile object movement information at the stage of calculating a velocity vector of the mobile object, a deterioration in estimation accuracy originating from the information relating to the distances between the information transmission sources and the mobile object, which is susceptible to errors, is less likely to occur than if the information relating to distances between the information transmission sources and the mobile object were matched up and coupled to estimate an absolute position. Therefore, the first aspect of the present invention may estimate the position of the mobile object accurately.

The estimation section selects a plural number of points at different times such that distances between adjacent points are spaced by at least a predetermined distance. Accordingly, in the first aspect of the present invention, randomness may be provided to errors in the observed values that are used for optimum estimation by the estimation section. Therefore, the first aspect of the present invention may improve the accuracy of position estimation.

A second aspect of the present invention is a computer readable medium storing a program causing a computer to execute a process for a position estimation of a mobile object, the process including: acquiring transmission source information transmitted from each of a plurality of information transmission sources, the transmission source information including information relating to a position of the each information transmission source, information relating to a distance between the each information transmission source and the mobile object, and information relating to a relative velocity of the mobile object with respect to the each information transmission source; calculating a trajectory of the mobile object by integrating velocity vectors of the mobile object over a predetermined duration, the velocity vectors of the mobile object being obtained on the basis of the acquired transmission source information; and estimating, as the position of the mobile object, a position for which the calculated trajectory of the mobile object is translated such that a difference between distances between a plurality of points at different times on the trajectory of the mobile object and the respective information transmission sources and the acquired distances between the respective information transmission sources and the mobile object is at a minimum.

The computer readable medium storing the position estimation program of the present invention is not particularly limited, and may be a hard disc or may be a ROM. The medium may also be a CD-ROM, a DVD, a magneto-optical disc, a chip card or the like. The program may also be downloaded from a server connected to a network or the like.

As described above, the position estimation apparatus and the computer readable medium storing the position estimation program of the present invention couple acquire information relating to distances between respective information transmission sources and a mobile object by reference to a trajectory of the mobile object with a highly accurate shape and orientation that is calculated from velocity vectors of the mobile object, and translate the trajectory of the mobile object to an optimum position to estimate a position of the mobile object. Thus, the position estimation apparatus and the computer readable medium storing the position estimation program of the present invention may estimate the position of a mobile object accurately.

BRIEF DESCRIPTION OF THE DRAWINGS

Exemplary embodiments of the present invention will be described in detail based on the following figures, wherein.

DETAILED DESCRIPTION OF THE INVENTION

Herebelow, exemplary embodiments of the present invention will be described in detail with reference to the attached drawings. Note that, in the present exemplary embodiments, a case in which the present invention is applied to a vehicle-mounted position estimation apparatus that is mounted at a vehicle, acquires GPS information transmitted from GPS satellites, and estimates positions of the vehicle, will be described as an example.

Figure 1:
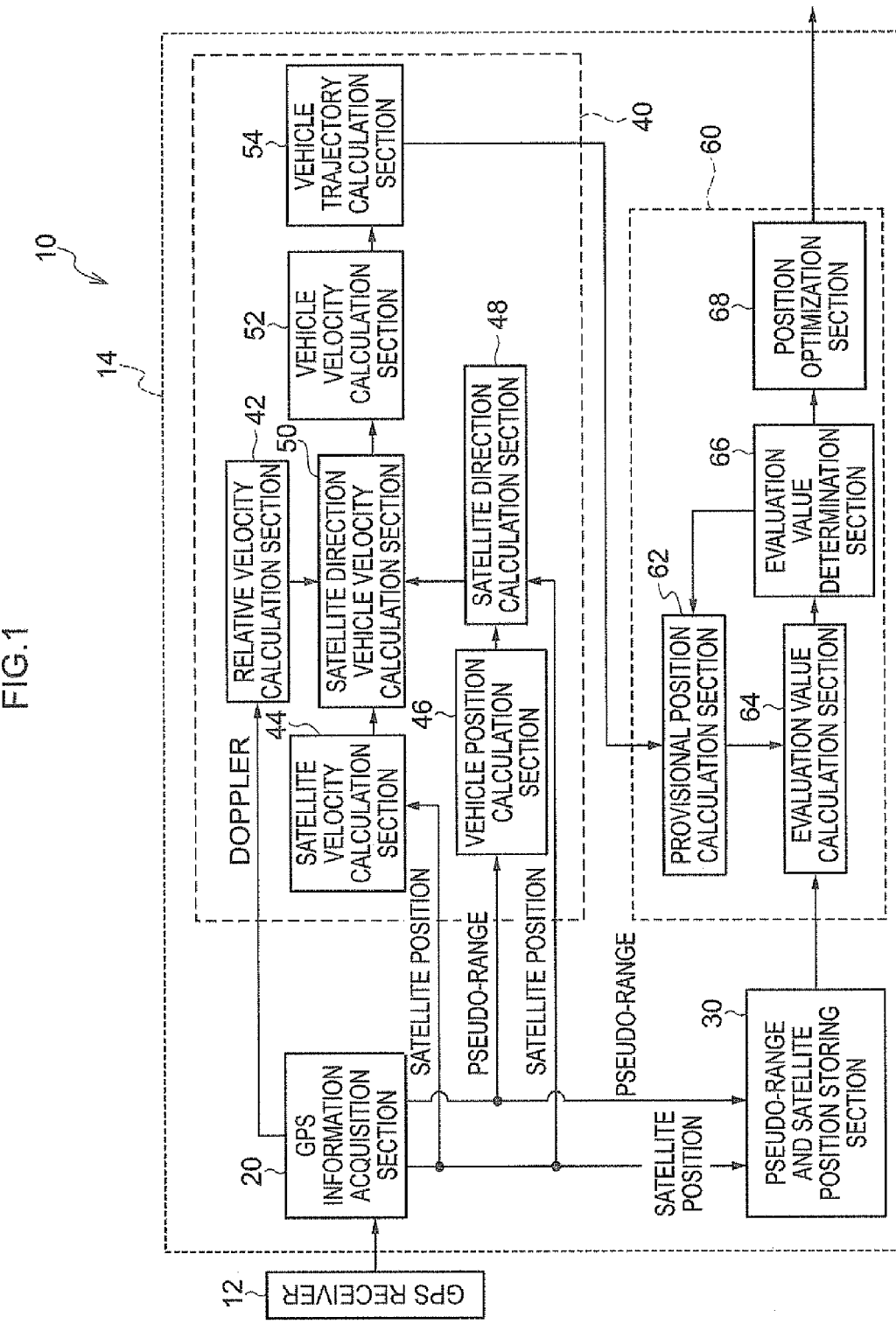
FIG. 1 is a block diagram illustrating a vehicle-mounted position estimation apparatus according to a first exemplary embodiment.

As illustrated in FIG. 1, a vehicle-mounted position estimation apparatus 10 according to a first exemplary embodiment is provided with a GPS receiver 12 and a computer 14. The GPS receiver 12 receives radio waves from GPS satellites. The computer 14 executes process for estimation of positions of the automobile on the basis of received signals from the GPS satellites that are received by the GPS receiver 12.

The GPS receiver 12 receives radio waves from a plural number of GPS satellites. From the received signals received from all of the GPS satellites, the GPS receiver 12 acquires satellite ID numbers of the GPS satellites, navigation information of the GPS satellites (ephemeris), times of radio waves transmitted by the GPS satellites, and strengths, frequencies and the like of the received signals, as GPS satellite information, and outputs to the computer 14.

The computer 14 is constituted with a CPU, a ROM storing a program for execution of a below-described position estimation process routine, a RAM that temporarily stores data, and a memorization device such as an HDD or the like.

If the computer 14 is represented by functional blocks according to the position estimation processing routine described below, then, as illustrated in FIG. 1, the computer 14 may be represented by a configuration that includes a GPS information acquisition section 20, a pseudo-range and satellite position storing section 30, a trajectory estimation section 40 and an optimum position estimation section 60. The GPS information acquisition section 20 acquires the GPS satellite information for all the GPS satellites whose radio wave signals are received from the GPS receiver 12, and calculates and acquires GPS pseudo-range data, Doppler frequencies and positional coordinates of the GPS satellites. The pseudo-range and satellite position storing section 30 stores the acquired GPS pseudo-range data and GPS satellite positional coordinates over a predetermined duration. The trajectory estimation section 40 estimates a trajectory of the automobile in the predetermined duration on the basis of the acquired GPS satellite information. The optimum position estimation section 60 estimates an absolute position of the automobile by optimization processes based on the estimated trajectory of the automobile and the stored pseudo-ranges and satellite positions.

The GPS information acquisition section 20 acquires the GPS satellite information for all the GPS satellites whose radio waves are received. In addition, the GPS information acquisition section 20 calculates GPS pseudo-range data, on the basis of times at which the radio waves are transmitted by the GPS satellites, and times at which the radio waves are received at the vehicle. The GPS information acquisition section 20 also calculates respective Doppler frequencies of the received signals from the GPS satellites on the basis of previously known frequencies of the signals transmitted from the GPS satellites and frequencies of the received signals that are received from the GPS satellites. These Doppler frequencies are frequencies in which Doppler shifts of a carrier wave frequency are observed in accordance with relative velocities of the GPS satellites and the vehicle. Further, the GPS information acquisition section 20 also calculates respective positional coordinates of the GPS satellites, on the basis of the navigation information of the GPS satellites, and the times at which the radio waves are transmitted by the GPS satellites.

The trajectory estimation section 40 may be represented by a configuration including a relative velocity calculation section 42, a satellite velocity calculation section 44, a vehicle position calculation section 46, a satellite direction calculation section 48, a satellite direction vehicle velocity calculation section 50, a vehicle velocity calculation section 52, and a vehicle trajectory calculation section 54. The relative velocity calculation section 42 calculates relative velocities of the vehicle with respect to the GPS satellites on the basis of the acquired Doppler frequencies of the GPS satellites. The satellite velocity calculation section 44 calculates velocity vectors of the GPS satellites on the basis of time series data of the acquired positional coordinates of the GPS satellites. The vehicle position calculation section 46 calculates a position of the vehicle on the basis of the acquired GPS pseudo-range data of the GPS satellites. The satellite direction calculation section 48 calculates directions (angular relationships) of the GPS satellites on the basis of the calculated position of the vehicle and the positional coordinates of the GPS satellites.

The satellite direction vehicle velocity calculation section 50 calculates velocities of the vehicle in the directions of the GPS satellites on the basis of the calculated relative velocities, the velocity vectors of the GPS satellites and the directions of the GPS satellites. The vehicle velocity calculation section 52 calculates velocity vectors of the vehicle on the basis of the plural calculated velocities of the vehicle in the directions of the GPS satellites. The vehicle trajectory calculation section 54 integrates the calculated velocity vectors of the vehicle over a predetermined duration, and calculates a trajectory of the vehicle in the predetermined duration.

The relative velocity calculation section 42 calculates the relative velocity of the vehicle with respect to each GPS satellite, from the Doppler shift frequency of the received signals from the GPS satellite, in accordance with the following expression (I), which expresses the relationship between a Doppler shift frequency and a relative velocity with respect to a GPS satellite.

$$v_j = -D1_j \cdot C/F_1 \quad (1)$$

Here, $v_j$ denotes the relative velocity with respect to a GPS satellite j, $D1_j$ denotes a Doppler shift frequency (Doppler shift) obtained from the GPS satellite j, C denotes the speed of light, and $F_1$ denotes the previously known $L_1$ frequency of signals transmitted from GPS satellites.

The satellite velocity calculation section 44 calculates the velocity vector of each GPS satellite from time series data of the acquired positional coordinates of the GPS satellite (speeds in three dimensions, $VX_j$, $VY_j$ and $VZ_j$), using the differential of the Kepler equation. For example, the velocity vector of each GPS satellite is calculated using the method described in Non-Patent Reference: Pratap Misra and Per Enge, 2004, *Global Positioning System: Signals, Measurements and Performance*, trans. Japan Institute of Navigation GPS Research Committee, published in Japan by Seiyou Bunko.

The vehicle position calculation section 46 calculates the position of the vehicle using the GPS pseudo-range data of the GPS satellites acquired by the GPS information acquisition section 20.

Figure 2:
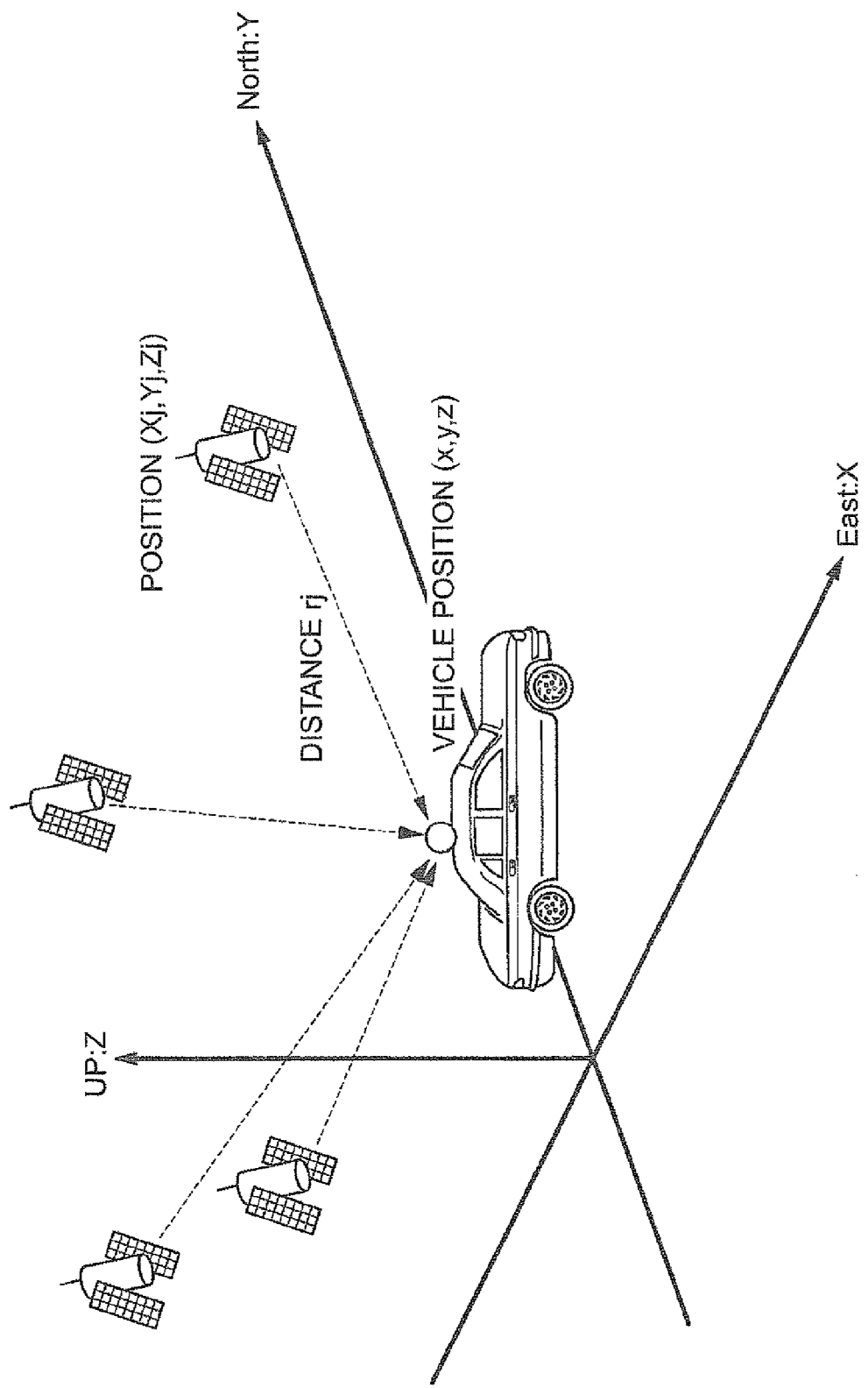
FIG. 2 is a conceptual diagram illustrating a condition in which the position of an automobile is estimated in accordance with the principles of triangulation.

In navigation using GPS, as illustrated in FIG. 2, the position of a vehicle is estimated in accordance with the principle of triangulation, on the basis of previously known positional coordinates of GPS satellites and pseudo-ranges, which are propagation distances of the received signals received from the GPS satellites.

The actual distance $r_j$ to a GPS satellite is represented by the following expression (2), and a pseudo-range $\rho_j$ measured by GPS is represented by the following expression (3).

$$r_j = \sqrt{(X_j - x)^2 + (Y_j - y)^2 + (Z_j - z)^2} \quad (2)$$

$$\rho_j = r_j + s \quad (3)$$

Here, $(X_j, Y_j, Z_j)$ denotes the positional coordinates of GPS satellite j, (x, y, z) denotes the positional coordinates of the vehicle, and s denotes a distance error caused by a time error of the GPS receiver 12.

From the above expression (2) and expression (3), the coordinates of the vehicle (x, y, z) are calculated by solving the simultaneous equations in the following expression (4), which are obtained from the GPS pseudo-range data of four or more GPS satellites.

$$\begin{cases} \rho_1 = \sqrt{(X_1 - x)^2 + (Y_1 - y)^2 + (Z_1 - z)^2} + s \\ \rho_2 = \sqrt{(X_2 - x)^2 + (Y_2 - y)^2 + (Z_2 - z)^2} + s \\ \vdots \\ \rho_N = \sqrt{(X_N - x)^2 + (Y_N - y)^2 + (Z_N - z)^2} + s \end{cases} \quad (4)$$

In the present exemplary embodiment, the position of the vehicle is calculated in order to find the directions of the GPS satellites (angles between the GPS satellites and the vehicle). However, because these directions are directions to GPS satellites which are located far away, this positioning may be approximate, and the position determination may not be conducted by using the pseudo-ranges. The effect of time is small and, provided error in positioning of the vehicle is within a range of a few hundred meters, an error in speed estimation is of the order of 1 m/s or less, although this depends on an estimation accuracy that is allowed for by the system and suchlike. Therefore, for this position of the vehicle, the position may be determined, for example, from a map or the like, or the position may be determined from a measurement history of previous positions or information of beacons or the like.

On the basis of the calculated position of the vehicle and the positional coordinates of each GPS satellite, the satellite direction calculation section 48 calculates an angular relationship as the direction of each GPS satellite.

Figure 3:
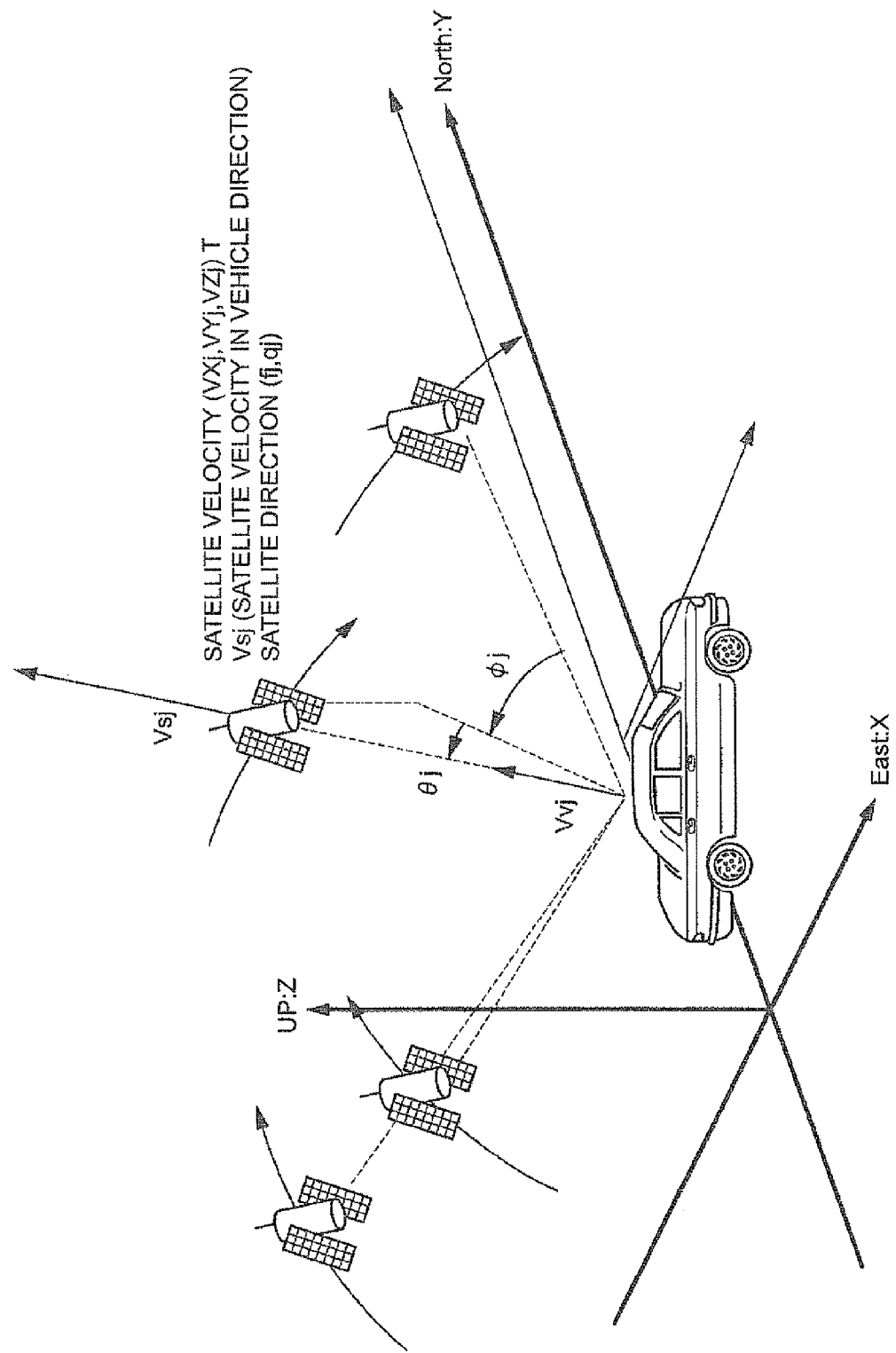
FIG. 3 is a conceptual diagram illustrating a condition in which velocities of the automobile in directions to GPS satellites are calculated on the basis of velocity vectors of the GPS satellites and the directions of the GPS satellites.

As illustrated in FIG. 3, the satellite direction vehicle velocity calculation section 50 calculates a vehicle velocity $Vv_j$ in the direction to each GPS satellite j in accordance with the following expression (5), on the basis of the calculated relative velocity $v_j$ of the vehicle with respect to the GPS satellite, the velocity vector of the GPS satellite ($VX_j$, $VY_j$, $VZ_j$), and the direction to the GPS satellite $R_j$ ($\theta_j$, $\phi_j$).

$$\begin{aligned} v_j &= \frac{\partial \rho_j}{\partial t} \\ &= \frac{\partial \left( \sqrt{(X_j - x)^2 + (Y_j - y)^2 + (Z_j - z)^2} + s \right)}{\partial t} \\ &= Vs_j - Vv_j + vCb \end{aligned} \quad (5)$$

Here, $v_j$ denotes the relative velocity of the vehicle with respect to GPS satellite j (a speed relative to the GPS satellite in the direction of the satellite). Further, $Vs_j$ denotes a velocity of the GPS satellite j in the direction to the vehicle, which is found by $Vs_j = R_j [VX_j, VY_j, VZ_j]^T$. Furthermore, $Vv_j$ denotes the speed of the vehicle in the direction to GPS satellite j, and vCb denotes a clock bias variation.

As described above, the speed of the vehicle in the direction to the GPS satellite is calculated only from the directional relationship with the GPS satellite, rather than from the position of the GPS satellite in three dimensions. Because a GPS satellite is far distant and circles the Earth about twice a day, an angular change in 1 minute is 0.5°. Ordinarily, a time difference between a GPS satellite and a GPS receiver is not more than 1 msec, and therefore, a time error does not give a great effect on the directional relationship with the GPS satellite. Similarly, because the GPS satellite is far distant, even if there is an error of some hundreds of meters in the positional determination of the vehicle, this does not give a great effect on the directional relationship with the GPS satellite. Accordingly, even in situations in which errors are likely to arise in pseudo-ranges, the vehicle velocities in the directions to the GPS satellites may be more reliably calculated than the pseudo-ranges.

As described below, the vehicle velocity calculation section 52 performs an optimum estimation of the velocity vector of the vehicle.

First, if the velocity vector of the vehicle is set to (Vx, Vy, Vz), the relationship with the velocity $Vv_j$ of the vehicle in the directions of a GPS satellite is represented by the following expression (6).

$$-Vx \cdot \cos\theta_j \sin\phi_j + Vy \cdot \cos\theta_j \cos\phi_j + Vz \cdot \sin\theta_j = Vv_j$$

$$v_j = -D_{1j} \cdot C/F_1 = Vs_j - Vv_j + vCb$$

$$Vv_j - vCb = Vs_j + D_{1j} \cdot C/F_1 \quad (6)$$

From the above expression (6) obtained for each GPS satellite j, values of Vx, Vy, Vz and Cb are estimated, and simultaneous equations as represented by the following expression (7) are obtained.

$$\begin{pmatrix} Vs_0 + D1_0 \cdot C/F1 \\ Vs_1 + D1_1 \cdot C/F1 \\ \vdots \\ Vs_N + D1_N \cdot C/F1 \end{pmatrix} = \quad (7)$$

$$\begin{pmatrix} -\cos\theta_0 \sin\phi_0 & \cos\theta_0 \cos\phi_0 & \sin\theta_0 & -1 \\ -\cos\theta_1 \sin\phi_1 & \cos\theta_1 \cos\phi_1 & \sin\theta_1 & -1 \\ \vdots & \vdots & \vdots & \vdots \\ -\cos\theta_N \sin\phi_N & \cos\theta_N \cos\phi_N & \sin\theta_N & -1 \end{pmatrix} \cdot \begin{pmatrix} Vx \\ Vy \\ Vz \\ vCb \end{pmatrix}$$

If there are four or more GPS satellites from which radio waves are being received, an optimum value of the velocity vector of the vehicle (Vx, Vy, Vz) is calculated by solving the simultaneous equations in the above expression (7).

The vehicle trajectory calculation section 54 calculates the trajectory of the vehicle by integrating the calculated velocity vectors of the vehicle over the predetermined duration. This predetermined duration is set to a suitable duration with which a required accuracy may be obtained. As mentioned above, the present exemplary embodiment calculates the velocity vectors of the vehicle using the vehicle's velocities in the directions of the GPS satellites, which are calculated more accurately than the pseudo-ranges, and calculates the trajectory of the vehicle by using the velocity vectors. Accordingly, the present exemplary embodiment may calculate the trajectory of the vehicle with a high accuracy in shape and orientation.

The optimum position estimation section 60 may be represented by a configuration including a provisional position calculation section 62, an evaluation value calculation section 64, an evaluation value determination section 66 and a position optimization section 68. The provisional position calculation section 62 calculates a provisional position on the basis of the calculated trajectory of the vehicle and translation quantities. The evaluation value calculation section 64 calculates a sum of differences, at epoch intervals, between distances of the vehicle trajectory at the provisional position from the GPS satellites and the pseudo-ranges at that epoch, for all the GPS satellites over all epochs, as an evaluation value. The evaluation value determination section 66 determines whether or not the calculated evaluation value is an optimum value and, if the evaluation value is not optimum, applies a translation to the vehicle trajectory. When the evaluation value is optimum, the position optimization section 68 outputs positions on the vehicle trajectory as optimized absolute positions.

For the calculated vehicle trajectory f(t), the provisional position calculation section 62 calculates a provisional position represented by the following expression (8).

$$f(t) = (f_x(t) + \Delta X, f_y(t) + \Delta Y, f_z(t) + \Delta Z, f_{Cb}(t) + \Delta Cb) \quad (8)$$

Here, $\Delta X$, $\Delta Y$, $\Delta Z$ and $\Delta Ch$ denote translation quantities in the x direction, y direction and z direction and a time error, respectively, and t denotes the time of each epoch (t=0 ... tn). The shape and orientation of the vehicle trajectory are accurately represented with reference to a certain point in time, and therefore, the optimum position may be estimated by translations by ($\Delta X$, $\Delta Y$, $\Delta Z$, $\Delta Cb$) while the shape and orientation of the vehicle trajectory are preserved. The provisional position calculation section 62 first calculates a provisional position, providing ($\Delta X_0$, $\Delta Y_0$, $\Delta Z_0$, $\Delta Cb_0$) as initial values of the translation quantities. The provisional position calculation section 62 then changes the translation quantities ($\Delta X$, $\Delta Y$, $\Delta Z$, $\Delta Cb$) on the basis of results of determination by the evaluation value determination section 66, which is described below, and calculates a provisional position.

For the calculated provisional position, the evaluation value calculation section 64 calculates an evaluation value E in accordance with the following expression (9) for each epoch on the vehicle trajectory.

$$E = \sum_{t0}^{tn} \sum_{j}^{N} (\rho_j(t) - d_j(t))^2 \quad (9)$$

Figure 4:
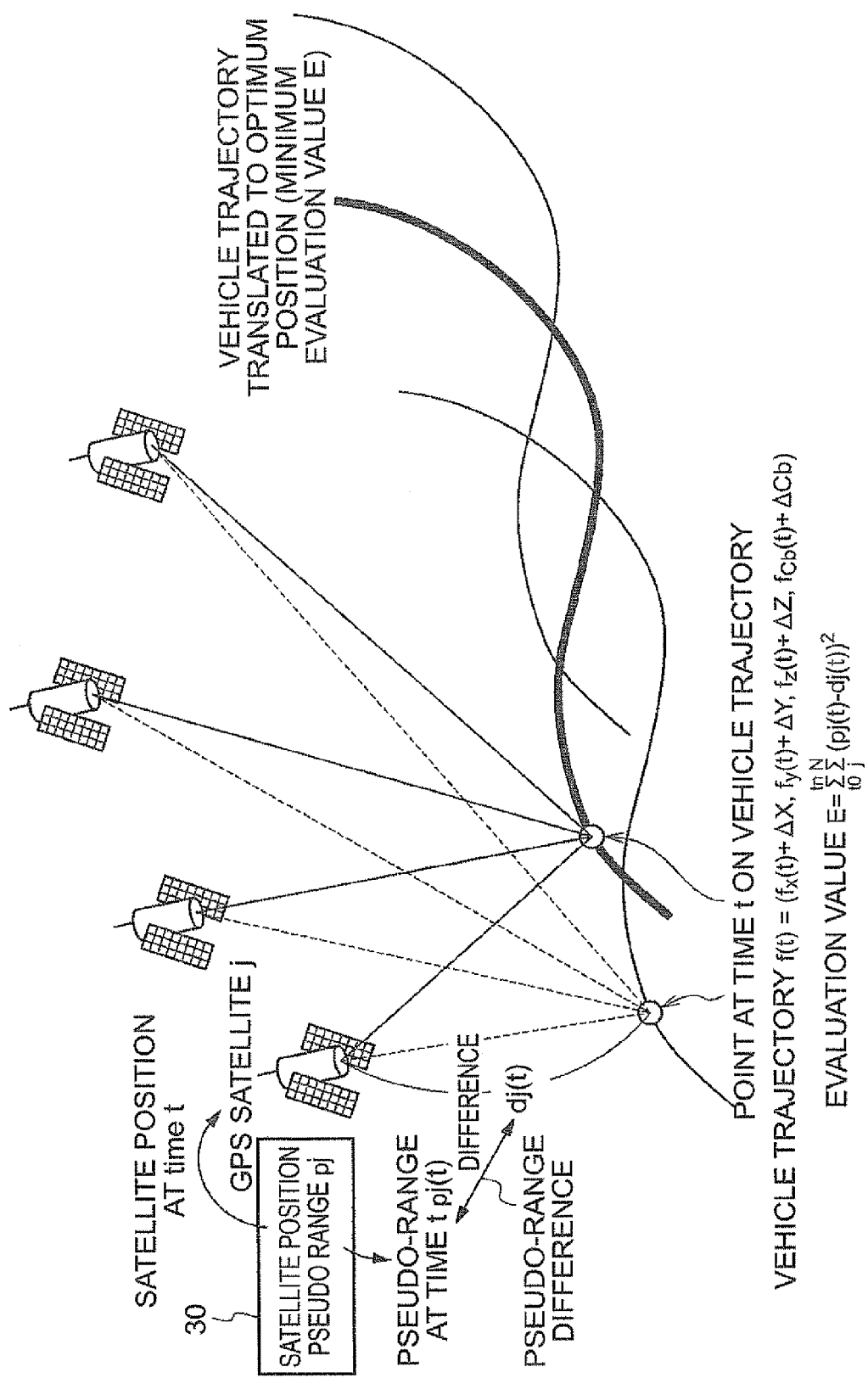
FIG. 4 is a conceptual diagram illustrating a condition in which a trajectory of the automobile is translated and an optimum position is estimated.

Here, $d_j(t)$ denotes a distance between a position on the vehicle trajectory at the provisional position at time t and each GPS satellite at time t, as illustrated in FIG. 4, and $\rho_j(t)$ denotes the pseudo-range at time t. The distance from the GPS satellite at time t is calculated using the positional coordinates of the GPS satellite at time t that are stored in the pseudo-range and satellite position storing section 30. For the pseudo-range at time t, the GPS pseudo-range data at time t that are stored by the pseudo-range and satellite position storing section 30 is used.

The evaluation value determination section 66 determines whether or not the calculated evaluation value is at a minimum, and if the evaluation value is not at a minimum, calculates translation quantities ($\Delta X$, $\Delta Y$, $\Delta Z$, $\Delta Cb$) so as to bring the evaluation value closer to a minimum, and passes to the provisional position calculation section 62. At the provisional position calculation section 62, a provisional position is calculated on the basis of the newly calculated translation quantities ($\Delta X$, $\Delta Y$, $\Delta Z$, $\Delta Cb$). Then the evaluation value E for this provisional position is calculated by the evaluation value calculation section 64. This processing is repeated until the evaluation value determination section 66 determines that the evaluation value is at a minimum, to perform optimization. Herein, widely known techniques such as the principles of bundle adjustment and the like may be used for the optimization process that is executed by the evaluation value determination section 66.

The evaluation value determination section 66 estimates that a position of the trajectory of the vehicle that is translated by the translation quantities ($\Delta X$, $\Delta Y$, $\Delta Z$, $\Delta Cb$) when the evaluation value is determined to be at a minimum by the evaluation value determination section 66, preserving the shape of the vehicle trajectory calculated by the vehicle trajectory calculation section 54, is an optimum position.

Next, operation of the vehicle-mounted position estimation apparatus 10 according to the first exemplary embodiment is described.

Figure 5:
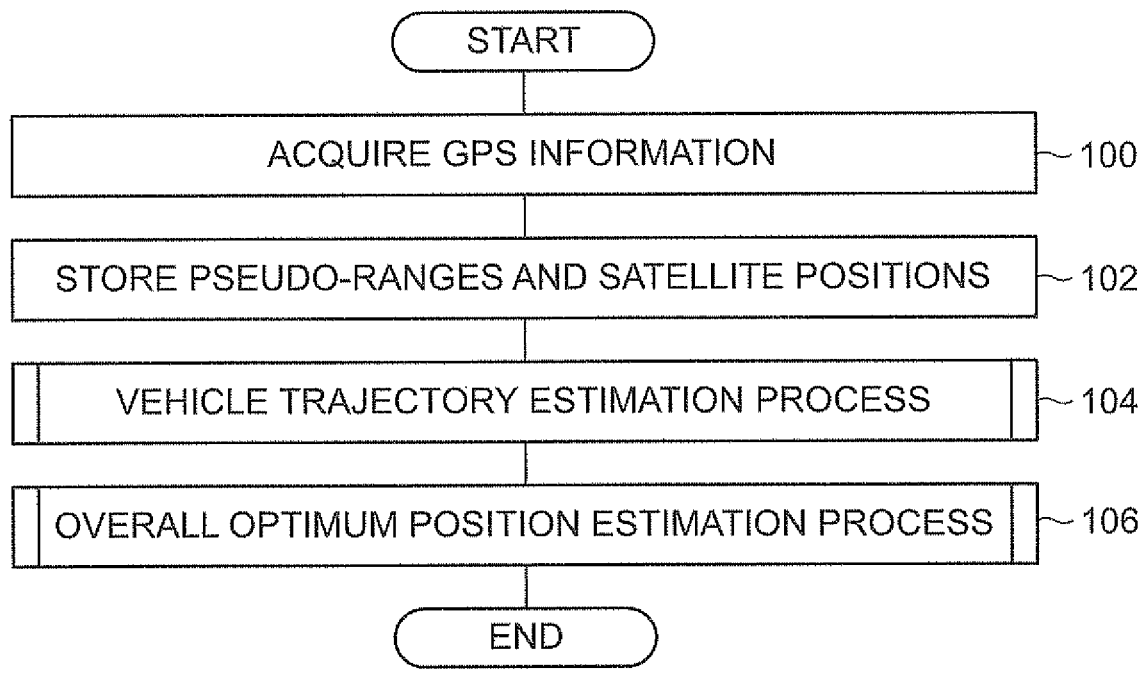
FIG. 5 is a flowchart illustrating details of a position estimation process routine at a computer of the vehicle-mounted position estimation apparatus according to the first exemplary embodiment.

When radio waves are received from plural GPS satellites by the GPS receiver 12, the position estimation processing routine illustrated in FIG. 5 is executed at the computer 14.

In step 100, information of the plural GPS satellites is acquired from the GPS receiver 12, and GPS pseudo-range data, Doppler frequencies and GPS satellite positional coordinates of the plural GPS satellites are calculated and acquired.

Then, in step 102, the pseudo-range data and positional coordinates of the GPS satellites acquired in step 100 are stored at the pseudo-range and satellite position storing section 30.

In step 104, vehicle trajectory estimation process, which is described below, is executed, and a trajectory of the vehicle over the predetermined duration is calculated. Then, in step 106, overall optimum position estimation process, which is described below, is executed and an optimized absolute position is estimated.

Figure 6:
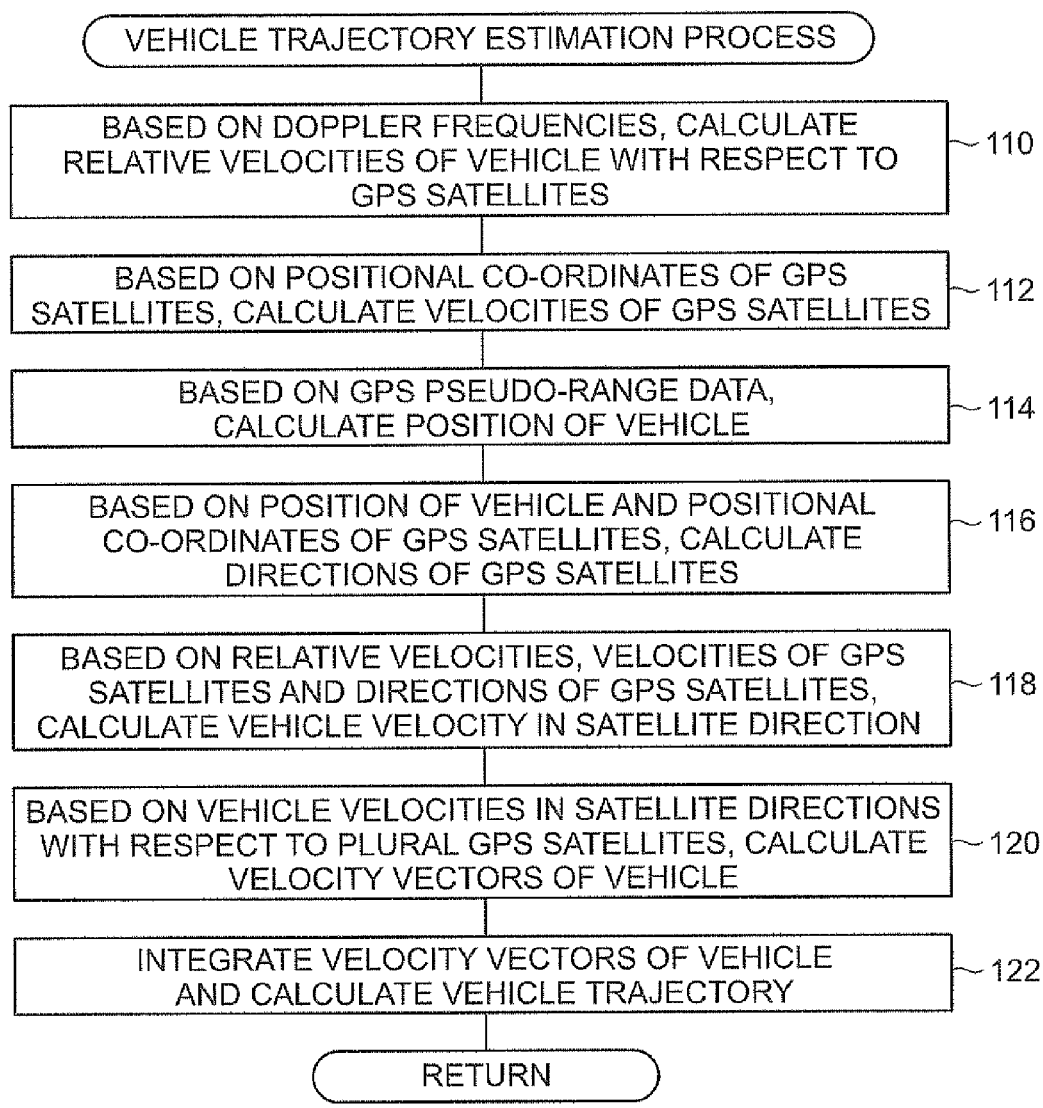
FIG. 6 is a flowchart illustrating details of a vehicle trajectory estimation process routine at the computer of the vehicle-mounted position estimation apparatus according to the first exemplary embodiment.

Next, the vehicle trajectory estimation process routine is described with reference to FIG. 6.

In step 110, in accordance with the above expression (1), relative velocities $v_j$ of the vehicle with respect to the GPS satellites are calculated from the Doppler frequencies of the received signals from the GPS satellites.

Then, in step 112, the velocity vector $(VX_j, VY_j, VZ_j)$ of each GPS satellite is calculated from time series data of the acquired positional coordinates of the GPS satellite, using the differential of the Kepler equation.

Then, in step 114, the position of the vehicle is calculated using the GPS pseudo-range data of the GPS satellites, in accordance with the above expressions (2) to (4). Note that, at this time, the position of the vehicle is being calculated in order to find the directions of the GPS satellites (the angles of the GPS satellites from the vehicle). Therefore, it is sufficient if the position of the vehicle can be approximately determined. For example, the position of the vehicle may be determined from a map or the like, and the position of the vehicle may be determined from a measurement history of previous positions or information of a beacon or the like.

In step 116, on the basis of the position of the vehicle calculated in step 114 and the positional coordinates of each GPS satellite, the angular relationship $R_j$ (the elevation $\theta_j$ with respect to the horizontal and the bearing $\phi_j$ with respect to North) between the position of each GPS satellite j and the position of the vehicle is calculated as the direction of the GPS satellite.

Then, in step 118, the velocity of the vehicle $Vv_j$ in the direction to each GPS satellite j is calculated in accordance with the above expression (5), on the basis of the calculated relative velocity $v_j$ of the vehicle with respect to the GPS satellite that has been calculated in step 112, the velocity vector of the GPS satellite $(VX_j, VY_j, VZ_j)$ that has been calculated in step 112, and the direction $R_j(\theta_j, \phi_j)$ to the GPS satellite that has been calculated in step 116. The velocity $Vs_j$ of the GPS satellite j in the direction to the vehicle in expression (5) is calculated by $Vs_j = R_j [VX_j, VY_j, VZ_j]^T$.

Then, in step 120, an optimum value of the velocity vector (Vx, Vy, Vz) of the vehicle is calculated in accordance with the above expression (6) and expression (7).

In step 122, the trajectory of the vehicle is calculated by integrating velocity vectors of the vehicle that have been calculated in step 120, and the process returns.

Figure 7:
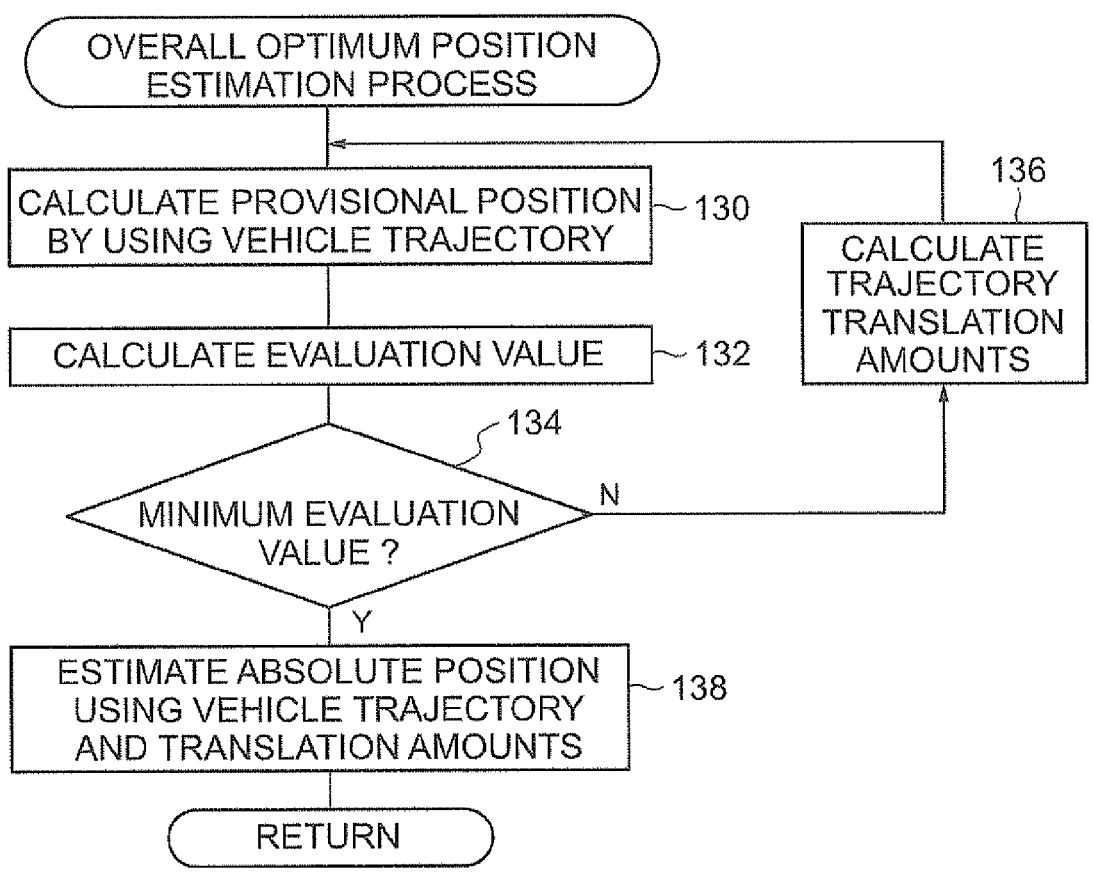
FIG. 7 is a flowchart illustrating details of an overall optimum position estimation processing routine at the computer of the vehicle-mounted position estimation apparatus according to the first exemplary embodiment.

Next, the overall optimum position estimation process routine is described with reference to FIG. 7.

In step 130, a provisional position represented by the above expression (8) is calculated on the basis of the calculated vehicle trajectory and the initial values $(\Delta X_0, \Delta Y_0, \Delta Z_0, \Delta Cb_0)$ of the translation quantities.

In step 132, in accordance with expression (9), a sum of pseudo-range differences, which are differences between distances $d_j(t)$, between positions on the vehicle trajectory at the provisional position represented by expression (8) at times t and the GPS satellites at the times t, and the pseudo-ranges $\rho_j(t)$ at the times t, for all the GPS satellites over all of a number of epochs, is calculated as the evaluation value E.

Then, in step 134, it is determined whether or not the evaluation value E that has been calculated in step 134 is at a minimum. If it is determined to be at a minimum, the computer 14 proceeds to step 138. On the other hand if it is determined not to be at a minimum, the computer 14 proceeds to step 136.

In step 136, translation quantities $(\Delta X, \Delta Y, \Delta Z, \Delta Cb)$ that should bring the evaluation value E closer to a minimum are calculated. The computer 14 returns to step 130, calculates a provisional position to which the vehicle trajectory is translated by the translation quantities $(\Delta X, \Delta Y, \Delta Z, \Delta Cb)$, and repeats the processing of step 132 and step 134 until the evaluation value E is determined to be at a minimum in step 134.

In step 138, the position to which is translated by the translation quantities $(\Delta X, \Delta Y, \Delta Z, \Delta Cb)$ when the evaluation value is determined to be at a minimum in step 134, while preserving the shape of the vehicle trajectory, is estimated as the optimum position. The computer 14 outputs the estimation results and returns, and ends the process.

Note that the present routine is an example of optimization of the overall position, and other methods may be employed. For example, a method of partial differentiation with estimated parameters so as to obtain an optimum solution after a number of updates may be used.

As described above, in the vehicle-mounted position estimation apparatus according to the first exemplary embodiment, accurately calculated velocity vectors of a vehicle are integrated, pseudo-range data is coupled by reference to the calculated vehicle trajectory, the vehicle trajectory is translated such that a sum of pseudo-range differences for all GPS satellites over all of a number of epochs is at a minimum, and an optimum position is estimated. Thus, the first exemplary embodiment may accurately estimate the position of the vehicle.

If the trajectory of the vehicle were calculated using data from an inertial navigation system or the like, the orientation would be uncertain. However, when the trajectory of the vehicle is calculated using velocity vectors of the vehicle as in the present exemplary embodiment, the orientation is established. Therefore, the present exemplary embodiment may reduce parameters for estimation of the position by optimization, making calculation easier.

Next, a second exemplary embodiment is described. Configurations of a vehicle-mounted position estimation apparatus of the second exemplary embodiment that are the same as in the vehicle-mounted position estimation apparatus 10 of the first exemplary embodiment are assigned the same reference numerals, and descriptions thereof are omitted.

The second exemplary embodiment principally differs from the first exemplary embodiment in coupling information detected by a device other than a GPS satellite that detects movements of the mobile object, to calculate velocity vectors of the vehicle. In the second exemplary embodiment, a case of coupling information (hereinafter referred to as INS information) detected by an inertial navigation system (INS) that serves as the device detecting movements of the mobile object, is described.

Figure 8:
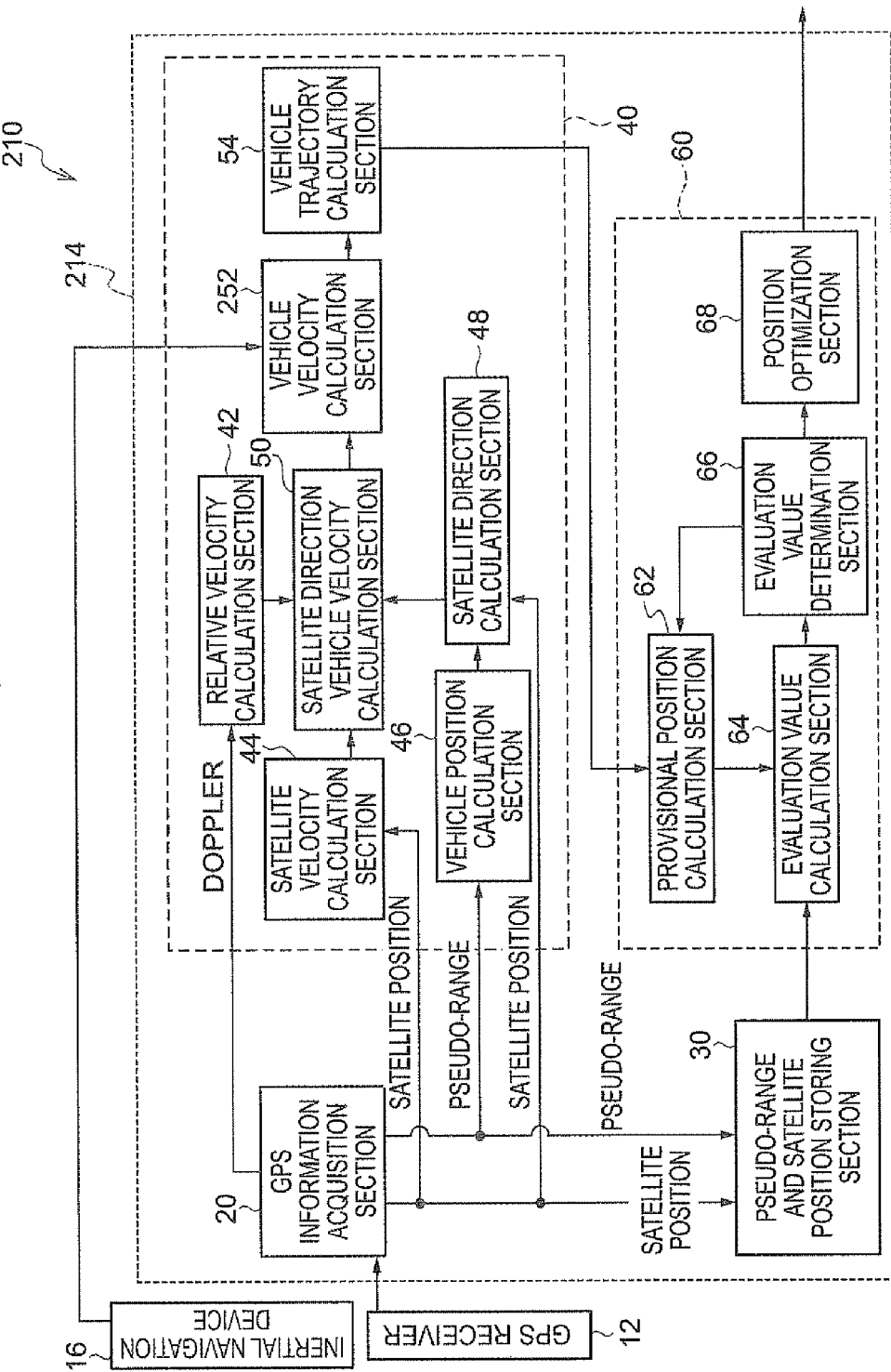
FIG. 8 is a block diagram illustrating a vehicle-mounted position estimation apparatus according to a second exemplary embodiment.

As illustrated in FIG. 8, a computer 214 of a vehicle-mounted position estimation apparatus 210 according to the second exemplary embodiment may be represented by a configuration including a vehicle velocity calculation section 252. The vehicle velocity calculation section 252 performs optimal estimation of velocity vectors of the vehicle with a velocity of the vehicle included in INS information, which is detected by an inertial navigation device 16, in addition to the velocities $Vv_j$ of the vehicle in the directions of the plural GPS satellites that are calculated by the satellite direction vehicle velocity calculation section 50. Other configurations are the same as in the first exemplary embodiment.

The vehicle velocity calculation section 252 calculates the velocity vector of the vehicle as an optimum solution of the simultaneous equations of the aforementioned expression (7), from the relationships of the aforementioned expression (6). However, if received signals can not be received at the GPS receiver 12 from a required plural number of GPS satellites to obtain the optimum solution of the simultaneous equations of expression (7), the vehicle velocity calculation section 252 applies the velocity of the vehicle detected by the inertial navigation device 16, to calculate the velocity vector of the vehicle without losing accuracy. This is not limited to when the number of received signals from the GPS satellite is insufficient; the velocity of the vehicle detected by the inertial navigation device 16 may be applied to calculate the velocity vector of the vehicle so as to promote an improvement in accuracy.

The vehicle velocity calculation section 252 may also, if the number of received signals from the GPS satellites is insufficient, assume that the drift of the clock bias is constant and set vCb in the simultaneous equations of expression (7) to a pre-specified constant value, thus reducing the number of variables in the simultaneous equations. Furthermore, if the provided predetermined duration for finding the trajectory of the vehicle is within a constant region, the vehicle velocity calculation section 252 may assume that movement is within a flat plane. Accordingly, the vehicle velocity calculation section 252 may set Vz in the simultaneous equations of expression (7) to zero, thus reducing the number of variables in the simultaneous equations.

As described above, according to the vehicle-mounted position estimation apparatus according to the second exemplary embodiment, velocity vectors of the vehicle are calculated using velocities of the vehicle included in INS information. Therefore, the second exemplary embodiment may estimate the position of the vehicle accurately even when the number of received signals from the GPS satellites is insufficient.

Furthermore, in the second exemplary embodiment, the coupling of the INS information with the GPS information (Doppler frequencies) is carried out at the stage of calculating the velocity vector of the vehicle. Therefore, a deterioration in estimation accuracy, due to the pseudo-ranges which are susceptible to errors, is less likely to occur than if the INS information and the GPS information (Doppler frequencies and pseudo-ranges) are coupled to calculate the absolute position of the vehicle. In consequence, the second exemplary embodiment may estimate the position of the vehicle accurately.

In the second exemplary embodiment, a case of using an inertial navigation system as the device other than the GPS satellites that detects movements of the mobile object, has been described. However, a vehicle-mounted exterior observation sensor or the like may be used as the device that detects movements of the mobile object.

Next, a third exemplary embodiment is described. Configurations of a vehicle-mounted position estimation apparatus of the third exemplary embodiment that are the same as in the vehicle-mounted position estimation apparatus 10 of the first exemplary embodiment are assigned the same reference numerals, and descriptions thereof are omitted.

The third exemplary embodiment principally differs from the first exemplary embodiment in that, when an optimized absolute position is being estimated, data of points that are selected so as to be points at predetermined distance intervals is used rather than data at epoch intervals.

Figure 9:
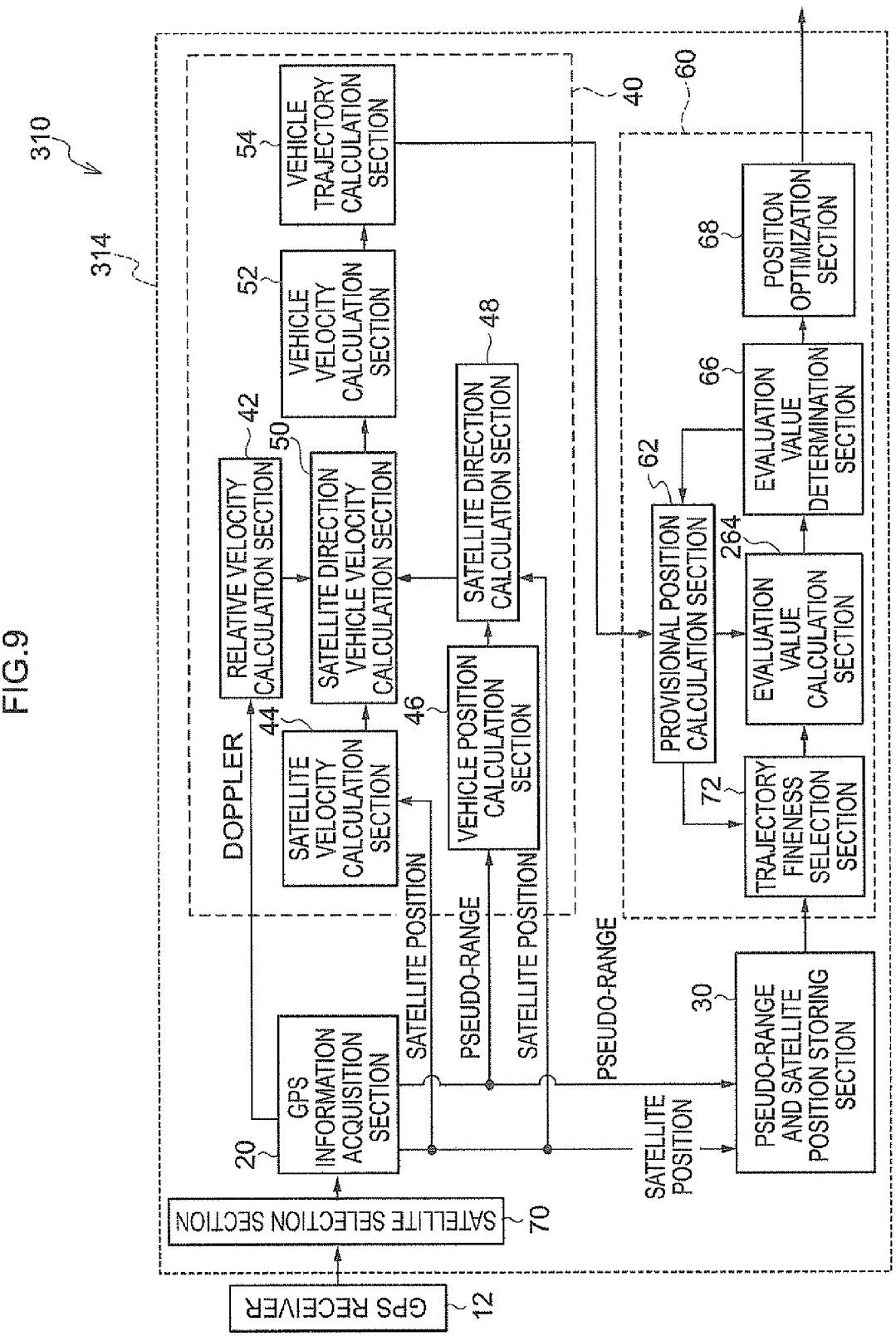
FIG. 9 is a block diagram illustrating a vehicle-mounted position estimation apparatus according to a third exemplary embodiment.

As illustrated in FIG. 9, a computer 314 of a vehicle-mounted position estimation apparatus 310 according to the third exemplary embodiment may be represented by a configuration including a satellite selection section 70 and a trajectory fineness selection section 72. The satellite selection section 70 selects GPS satellites that are estimated to have small errors in the pseudo-range. The trajectory fineness selection section 72 selects a fineness of the trajectory to be used by an evaluation value calculation section 264 of the optimum position estimation section 60. Other configurations are the same as in the first exemplary embodiment.

When received signals are received at the GPS receiver 12, the satellite selection section 70 discards GPS satellites from which received signals with a signal-to-noise ratio lower than a threshold value are received, and selects received signals from GPS satellites transmitting received signals whose signal-to-noise ratios are above the threshold value for use. Thus, the satellite selection section 70 may exclude GPS satellites for which it is anticipated that pseudo-range errors will be large.

The trajectory fineness selection section 72 selects a fineness of the trajectory to be used by the evaluation value calculation section 264, such that, when the evaluation value E is being calculated by the evaluation value calculation section 264, rather than being calculated at all epoch intervals in the predetermined duration from t0 to tn as in the first exemplary embodiment, the evaluation value E is calculated at epoch intervals at which distances between the positions of receiving the received signals are at least a predetermined distance. That is, the trajectory fineness selection section 72 selects pseudo-ranges to be used by the evaluation value calculation section 264 from among the pseudo-ranges stored in the pseudo-range and satellite position storing section 30. In this manner, the trajectory fineness selection section 72 specifies the fineness of the trajectory to be calculated by the provisional position calculation section 62. Thus, because pseudo-ranges at epoch intervals that are selected such that the distances between the receiving positions are at least the predetermined distance are used, the third exemplary embodiment reduces biases in the pseudo-ranges that are caused by multipaths in particular, and improves the accuracy of position optimization.

Here, the relationship between fineness of the trajectory and the accuracy of position optimization is described.

Figure 10:
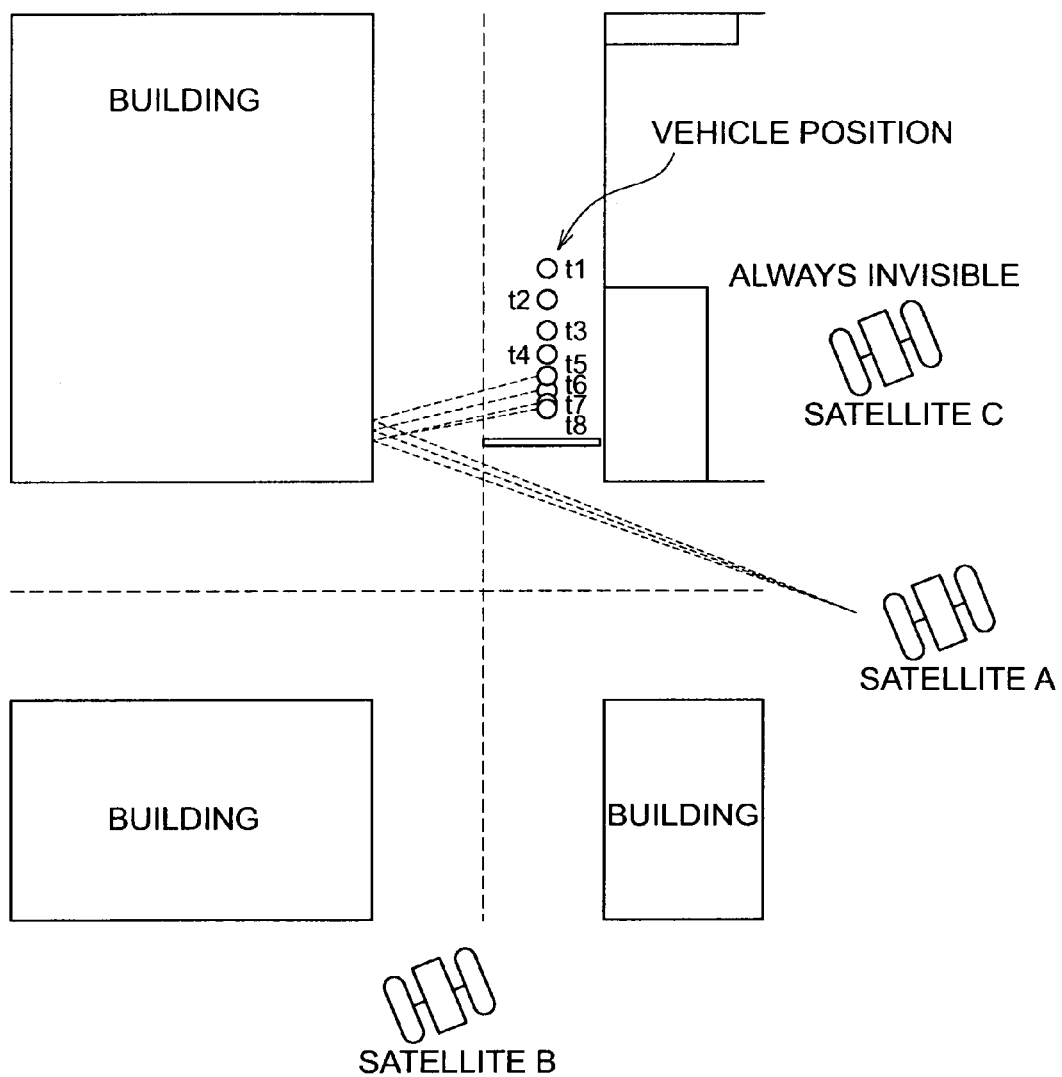
FIG. 10 is a conceptual diagram for describing a case in which pseudo-ranges used are acquired at predetermined time intervals.
Figure 11:
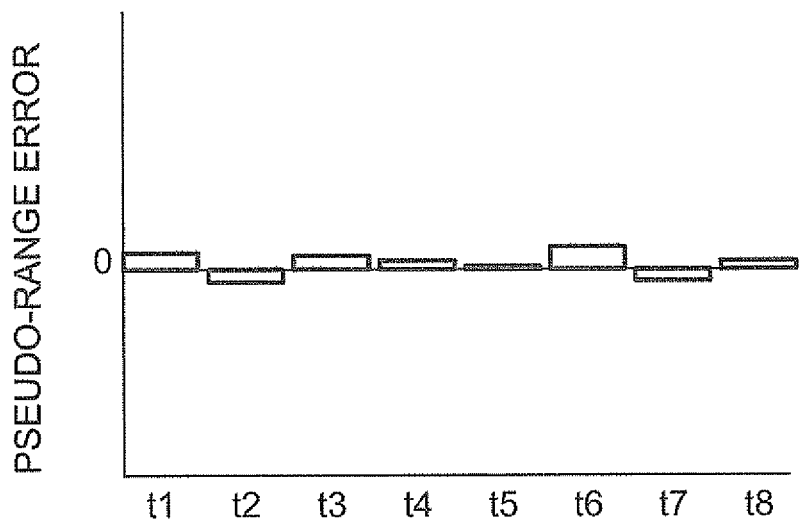
FIG. 11 is a diagram illustrating pseudo-range errors for GPS satellite B in FIG. 10.

FIG. 10 illustrates a case in which pseudo-ranges to be used are acquired at predetermined time intervals. In FIG. 10, a situation in which a vehicle is stopping at an intersection is assumed. Vehicle positions at times tn (n=1, 2, . . . , 8) with a constant time interval and paths of radio waves from a GPS satellite A that are received at the times tn are shown. In this case, the radio waves from GPS satellite B can always be directly received without being affected by multipaths, at the vehicle positions from time t1 to t8. Therefore, as illustrated in FIG. 11, errors in the pseudo-ranges that can be measured are small, and the pseudo-range errors at the respective times tend to have randomness. Even if these errors are large, they are of the order of a few meters.

In contrast, the radio waves from GPS satellite A may be received after being reflected by buildings, and multipath effects arise. When an electromagnetic wave in which this multipath effect arises is received, the error in the pseudo-range calculated from the signal that is received becomes large. Because the error in the pseudo-range is a path difference between a direct wave and a reflected wave, errors from a few meters to hundreds of meters may occur.

Figure 12:
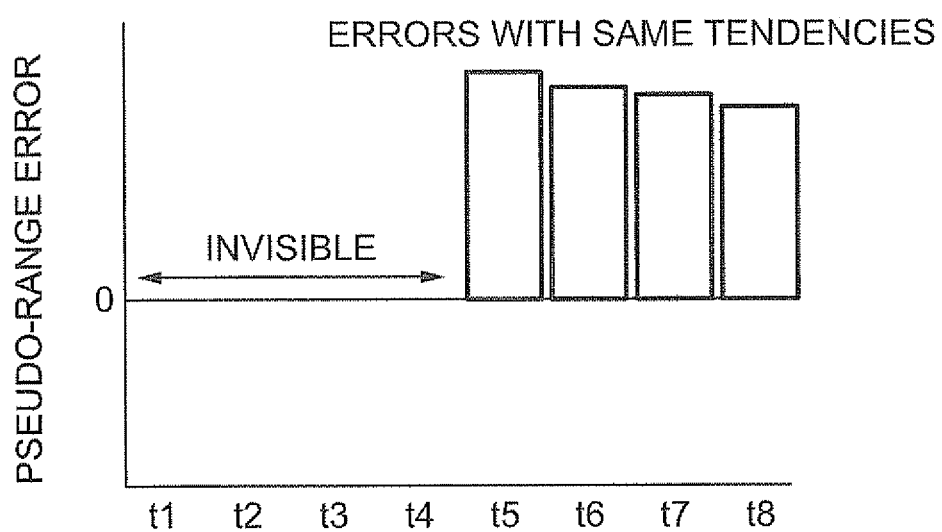
FIG. 12 is a diagram illustrating pseudo-range errors for GPS satellite A in FIG. 11.

In the least squares method, which is commonly used for optimum estimation of positions, calculations are performed with the assumption that errors are random (Gaussian). However, in the above-described situation illustrated in FIG. 10, if pseudo-ranges are acquired on the basis of GPS information received at times t1 to t8 from GPS satellite A and GPS satellite B, that is, if the pseudo-ranges to be used are acquired at predetermined time intervals, reflected waves such as the radio waves from GPS satellite A are received just before the vehicle stops. Accordingly, as illustrated in FIG. 12, consecutive large errors with a bias tendency occur in the received radio wave. Because the errors caused by multipaths strongly tend to be dependent on location, multipath errors that are received at close locations exhibit a similar tendency. In the vicinity of an intersection in an urban area, the road opens up in a square. Accordingly, the number of satellites from which signals are receivable increases but reflected waves also more likely to be received. In a practical environment, a plural number of satellites may be in a condition like GPS satellite A, which leads to errors being large. Moreover, the speed of a vehicle is often low in the vicinity of an intersection. Therefore, distances between intervals in which pseudo-ranges are acquired are short, and the category (number) of satellites from which radio waves can be received is limited. For example, in the situation in FIG. 10, GPS satellite C is hidden behind a building. Therefore, radio waves from GPS satellite C cannot be received in the whole region from time t1 to t8.

In the least squares method, as mentioned above, calculations are performed on the assumption that errors are random. Therefore, in order to reduce errors in optimization by the least squares method, it is useful if errors in the observed values that are used are endowed with randomness. Therefore, it is necessary to exclude large errors and biased errors as illustrated in FIG. 12. However, the pseudo-ranges that are acquired at predetermined time intervals are from a limited category of GPS satellites and errors in the acquired pseudo-ranges are large and have bias tendencies. Consequently, it is difficult to deal with these errors by a method of using least squares method residues to exclude satellites with multipaths or a method of changing combinations of satellites to exclude satellites with large errors, as in conventional proposals.

Figure 13:
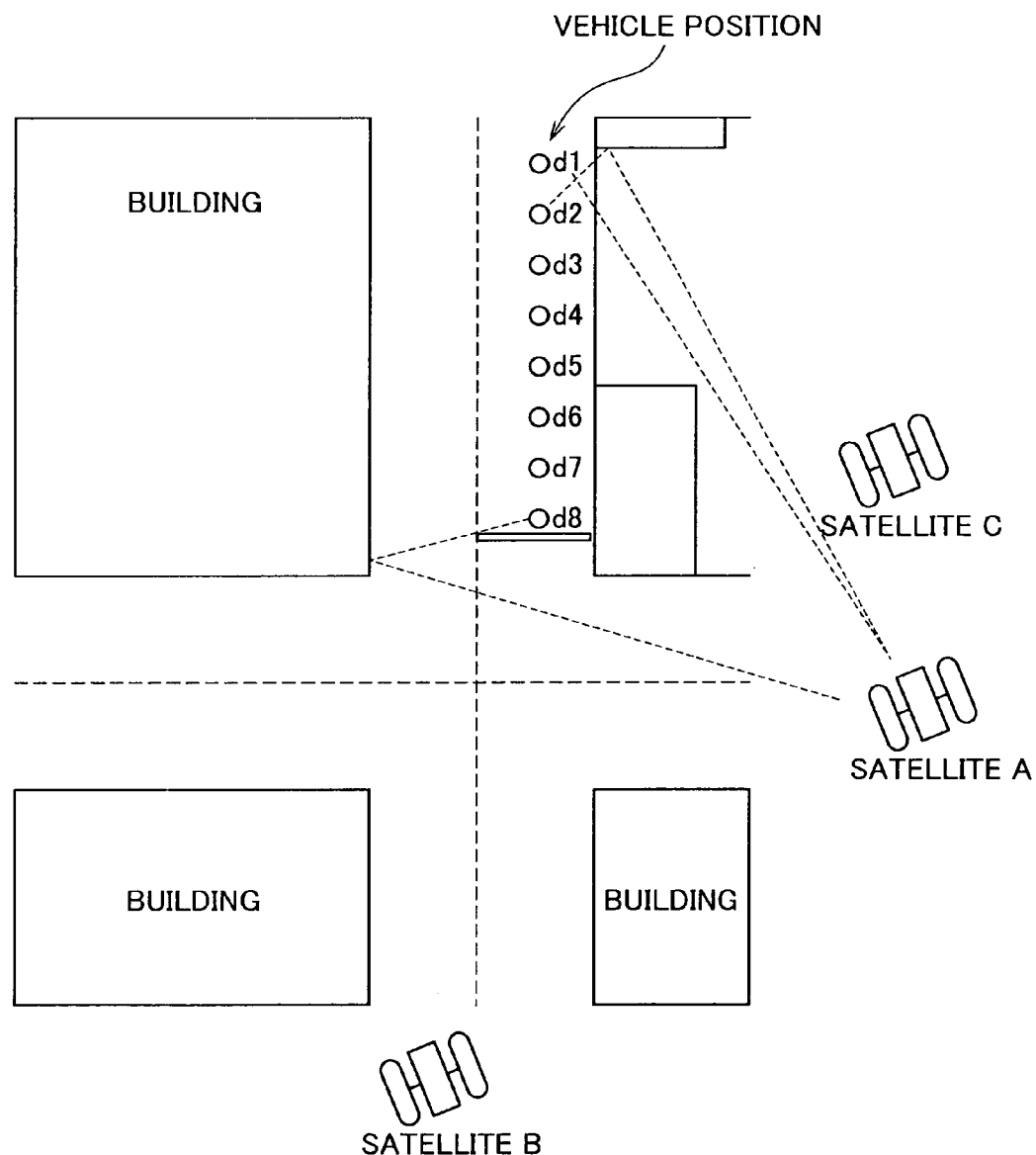
FIG. 13 is a conceptual diagram for describing a case in which pseudo-ranges used are acquired at a predetermined distance interval.
Figure 14:
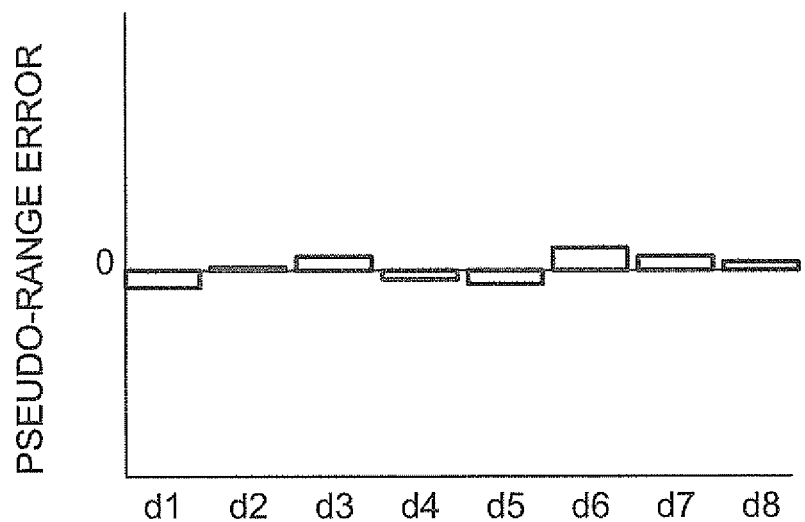
FIG. 14 is a diagram illustrating pseudo-range errors for GPS satellite B in FIG. 13.

In contrast, FIG. 13 illustrates a case in which the pseudo-ranges to be used are acquired at predetermined distance intervals. In FIG. 13, a situation in which a vehicle is stopping at an intersection, the same as in FIG. 10, is assumed. Vehicle positions at positions dm (m=1, 2, . . . , 8) with a constant distance spacing (a spacing of at least a predetermined distance), and paths of radio waves from GPS satellite A that are received at the positions dm are shown. In this case too, radio waves from GPS satellite B can always be directly received at the vehicle positions from position d1 to d8 without being affected by multipaths. Therefore, as illustrated in FIG. 14, errors in the pseudo-ranges that can be measured are small, and the pseudo-range errors at the respective positions tend to have randomness.

Figure 15:
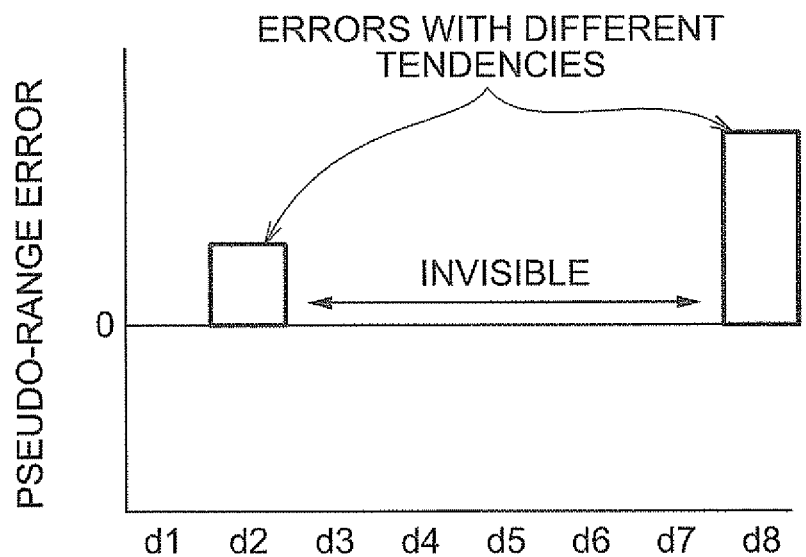
FIG. 15 is a diagram illustrating pseudo-range errors for GPS satellite A in FIG. 13.
Figure 16:
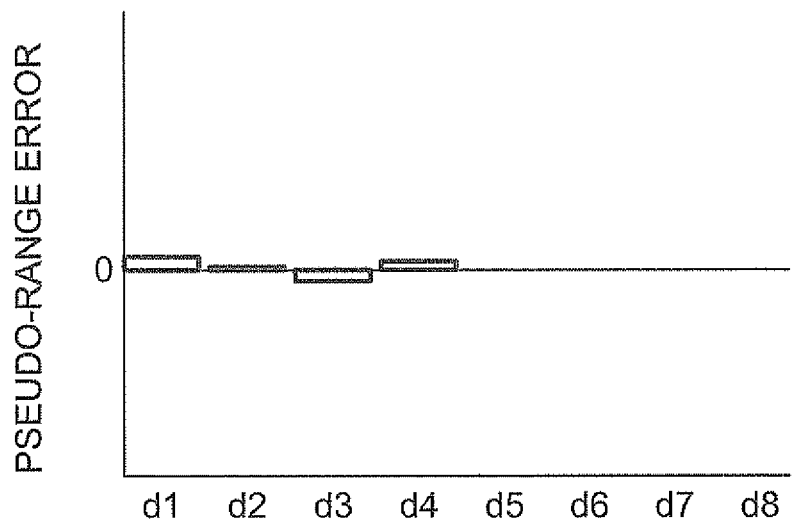
FIG. 16 is a diagram illustrating pseudo-range errors for GPS satellite C in FIG. 13.

Meanwhile, the radio waves from GPS satellite are received at locations that are further apart in distance than if they were received at predetermined time intervals. Therefore, even if there is an effect from multipaths, the errors differ by location. For example, as illustrated in FIG. 15, the radio waves received at position d2 and position d8 are affected by multipaths and have errors, but the errors have respectively different tendencies. Therefore, even though the effect of multipaths is included in the acquired pseudo-ranges, considering a predetermined region (d1 to d8 in this case) as a whole, randomness of the errors may be preserved. In addition, the pseudo-ranges are acquired at predetermined distance intervals regardless of the vehicle speed. Therefore, as illustrated in FIG. 16, the radio waves from GPS satellites C may be received and pseudo-ranges thereof may be acquired.

Thus, the radio waves from GPS satellite A, GPS satellite B and GPS satellite C are received at each of the positions from position d1 to position d8 and the pseudo-ranges are acquired, and randomness of the errors in the pseudo-ranges that are used in the least squares method may be raised. In addition, the category of satellites whose radio waves may be received is increased in number, compared to when pseudo-ranges are acquired at a predetermined time interval, and an improvement in the accuracy of position optimization may be expected.

Figure 17:
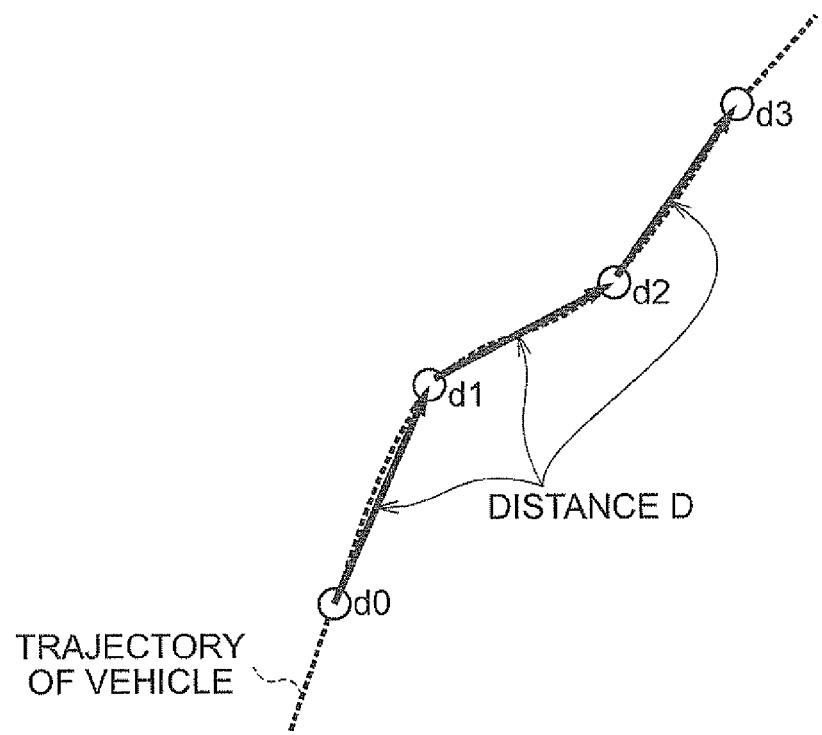
FIG. 17 is a conceptual diagram for describing a case in which points at predetermined distance intervals are selected from a trajectory.
Figure 18:
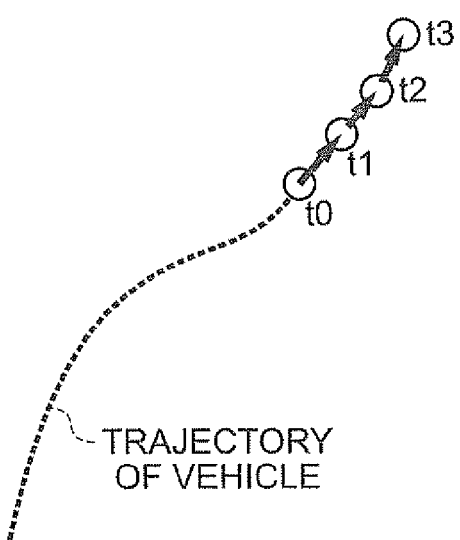
FIG. 18 is a conceptual diagram for describing a case in which points at predetermined time intervals are selected from the trajectory.

Specifically, as illustrated in FIG. 17, the trajectory fineness selection section 72 selects a plural number of points from a trajectory calculated by the provisional position calculation section 62 (in this case, d0 to d3), such that the distances between the points are a distance D (distance D being at least a predetermined distance). Note that, as illustrated in FIG. 18, the distance D is set such that the fineness of the trajectory is coarser than if points on the trajectory at a predetermined time interval (at every epoch) are selected. Then, from the pseudo-ranges and satellite positions stored in the pseudo-range and satellite position storing section 30, the trajectory fineness selection section 72 selects pseudo-ranges and satellite positions at epochs corresponding to the points din selected from the trajectory.

The evaluation value calculation section 264 uses the pseudo-ranges at intervals of the epochs selected by the trajectory fineness selection section 72 to calculate the evaluation value E. Specifically, the evaluation value calculation section 264 performs a calculation in accordance with the following expression (10).

$$E = \sum_{t_{d0}}^{t_{dm}} \sum_{j}^{N} (\rho_j(t) - d_j(t))^2 \qquad (10)$$

Here, $t_{dm}$ denotes the time of an epoch corresponding to a point dm selected by the trajectory fineness selection section 72. Therefore, $d_j(t_{dm})$ is calculated on the basis of the position of point din on the trajectory, that is selected by the trajectory fineness selection section 72 and the satellite position at the epoch corresponding to point dm. Further, $\rho_j(t_{dm})$ denotes the pseudo-range of the epoch corresponding to the point dm on the trajectory that is selected by the trajectory fineness selection section 72.

Next, operation of the vehicle-mounted position estimation apparatus 310 according to the third exemplary embodiment is described.

Figure 19:
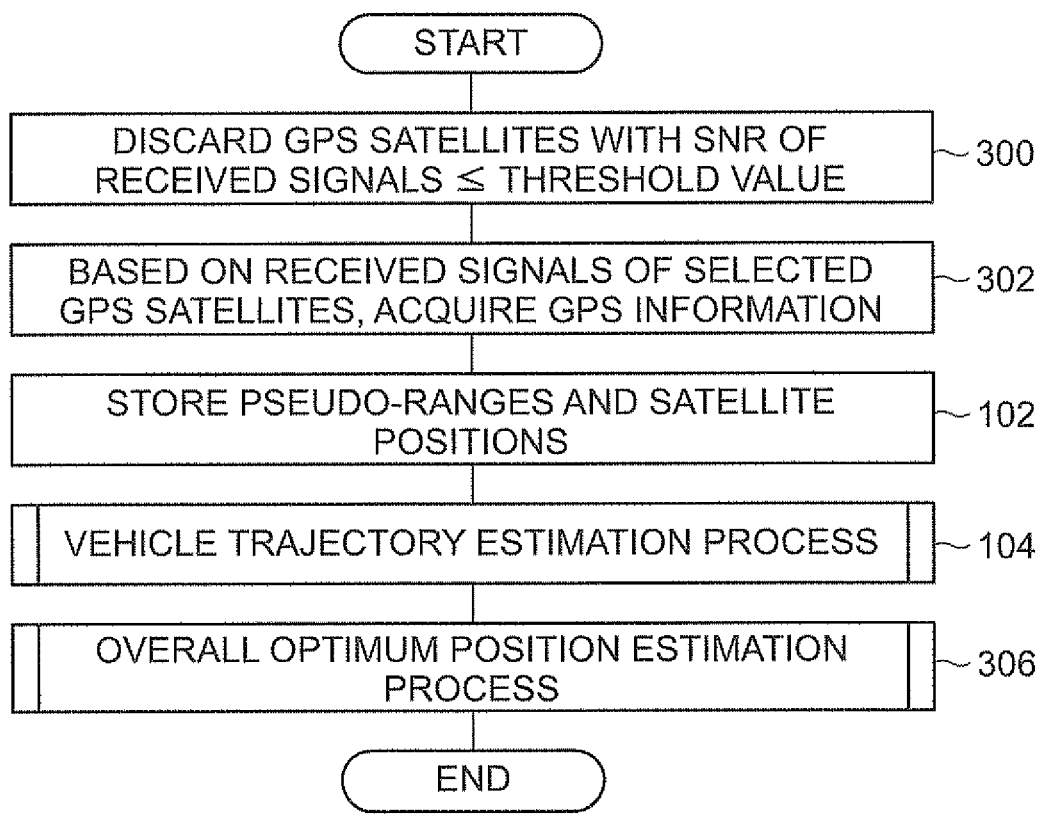
FIG. 19 is a flowchart illustrating details of a position estimation processing routine at a computer of the vehicle-mounted position estimation apparatus according to the third exemplary embodiment.

When radio waves are received from plural GPS satellites by the GPS receiver 12, the position estimation process routine illustrated in FIG. 19 is executed at the computer 314.

Process that is the same as in the position estimation processing of the first exemplary embodiment is assigned the same reference numerals, and descriptions thereof are omitted.

In step 300, GPS satellites for which the signal-to-noise ratio when the received signals are received by the GPS receiver 12 is not more than a pre-specified threshold value are discarded, and GPS satellites for which the signal-to-noise ratio is above the threshold value are selected.

Then, in step 302, information of the plural GPS satellites selected in step 300 is acquired from the GPS receiver 12, and GPS pseudo-range data, Doppler frequencies and GPS satellite position coordinates of the plural GPS satellites are calculated and acquired.

Then, in step 102, the pseudo-ranges and positional coordinates of the GPS satellites acquired in step 302 are stored at the pseudo-range and satellite position storing section 30.

Then, in step 104, vehicle trajectory estimation processing is executed in the same manner as in the first exemplary embodiment, and the trajectory of the vehicle over the predetermined duration is calculated. Then, in step 306, overall optimum position estimation processing, which is described below, is executed and the optimized absolute position is estimated.

Figure 20:
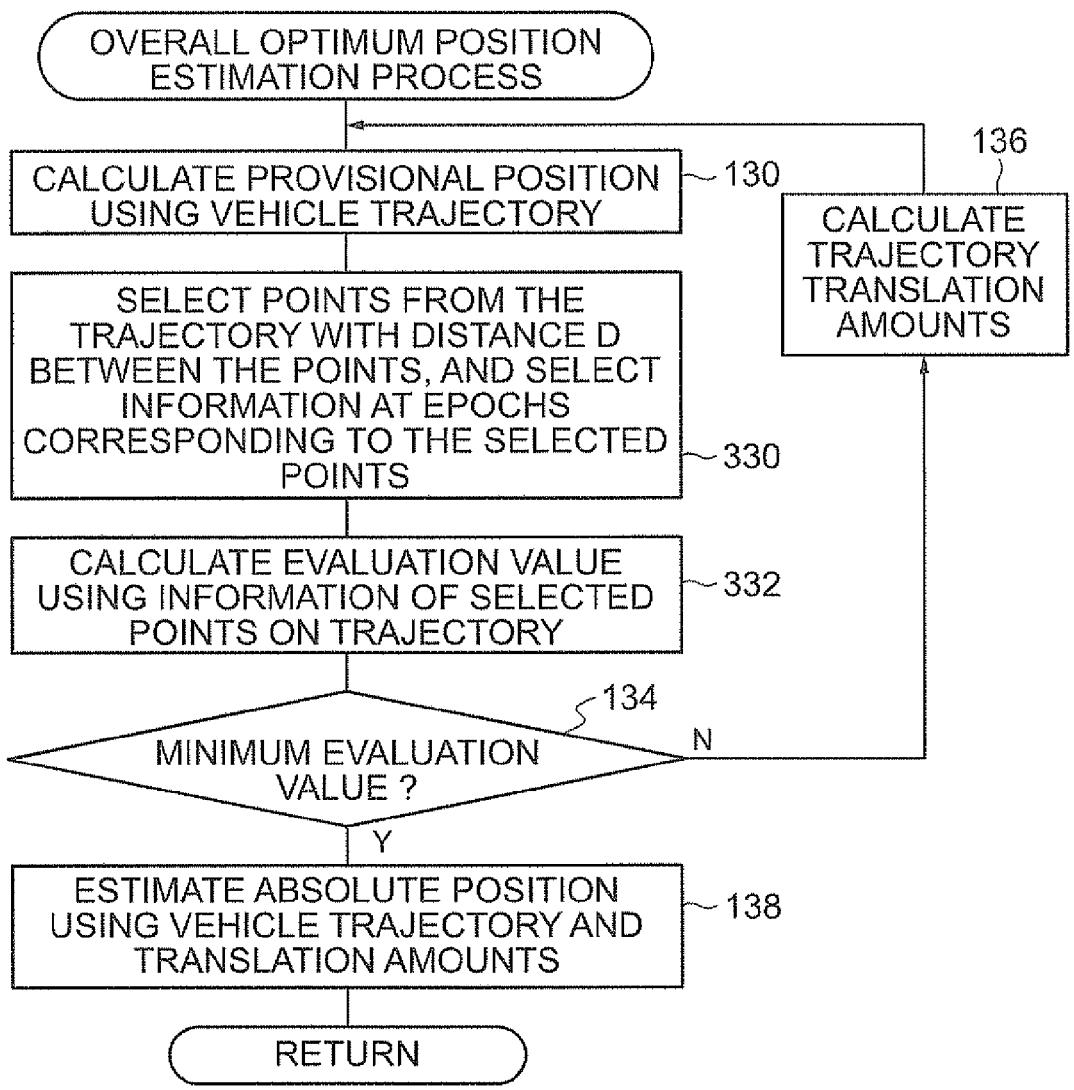
FIG. 20 is a flowchart illustrating details of an overall optimum position estimation processing routine at the computer of the vehicle-mounted position estimation apparatus according to the third exemplary embodiment.

Next, the overall optimum position estimation process routine is described with reference to FIG. 20. Here, processes that are the same as in the overall optimum position estimation processes of the first exemplary embodiment is assigned the same reference numerals, and descriptions thereof are omitted.

In step 130, a provisional position represented by the aforementioned expression (8) is calculated on the basis of the calculated vehicle trajectory and the initial values ($\Delta X_0$, $\Delta Y_0$, $\Delta Z_0$, $\Delta Cb_0$) of the translation quantities.

Then, in step 330, from the trajectory of the vehicle at the provisional position calculated in step 130, a plural number of points dm are selected such that distances between the points are the distance D. Then, from the pseudo-ranges and satellite positions stored in the pseudo-range and satellite position storing section 30, pseudo-ranges and satellite positions at the epochs corresponding to the points dm selected from the trajectory are selected.

In step 332, using the positions of the points dm on the trajectory that have been selected in step 330, the satellite positions at the epochs corresponding to the points dm and the pseudo-ranges at the epochs corresponding to the points din, the evaluation value E is calculated in accordance with the above expression (10).

Thereafter, steps 134 to 138 are executed in the same manner as in the first exemplary embodiment, and the position that is translated by the translation quantities ($\Delta X$, $\Delta Y$, $\Delta Z$, $\Delta Cb$) when the evaluation value E is determined to be at a minimum, preserving the shape of the vehicle trajectory, is estimated as the optimum position. The computer 314 outputs the estimation results and returns.

Figure 21A:
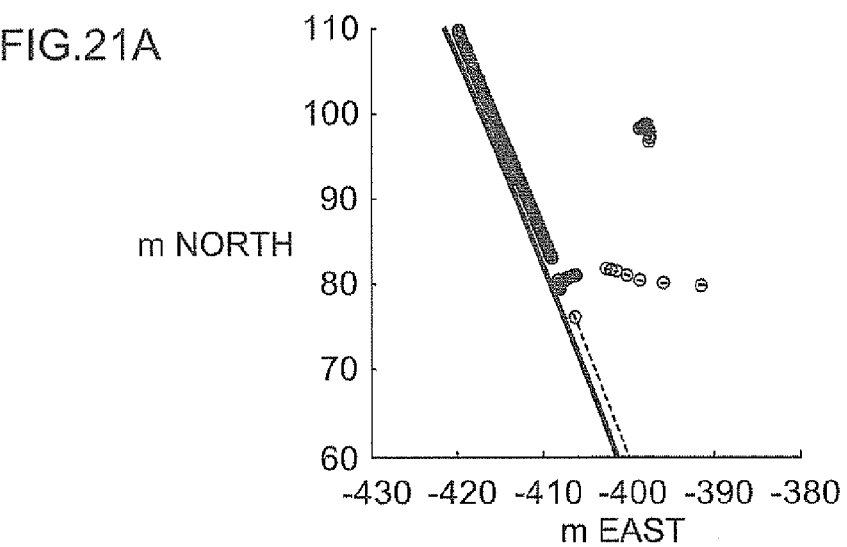
FIG. 21A to FIG. 21C are graphs illustrating actual values and position estimation results by the vehicle-mounted position estimation apparatus of the third exemplary embodiment.
Figure 21B:
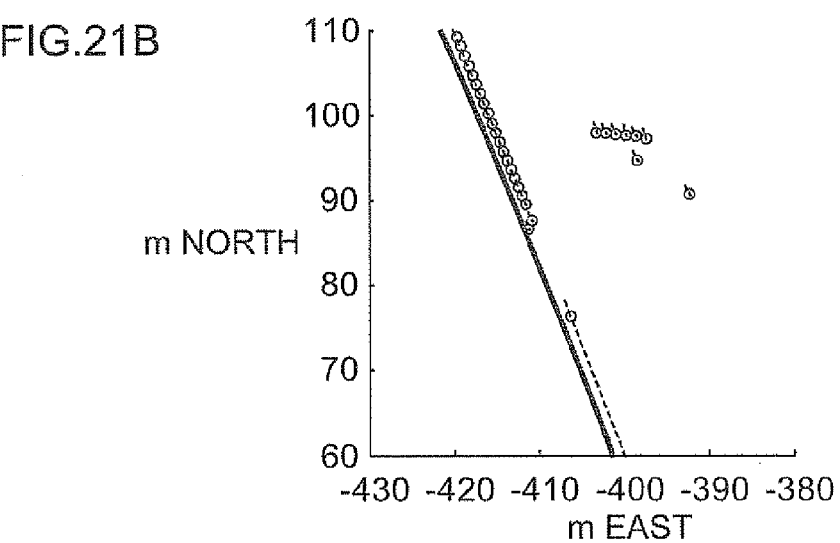
Figure 21C:
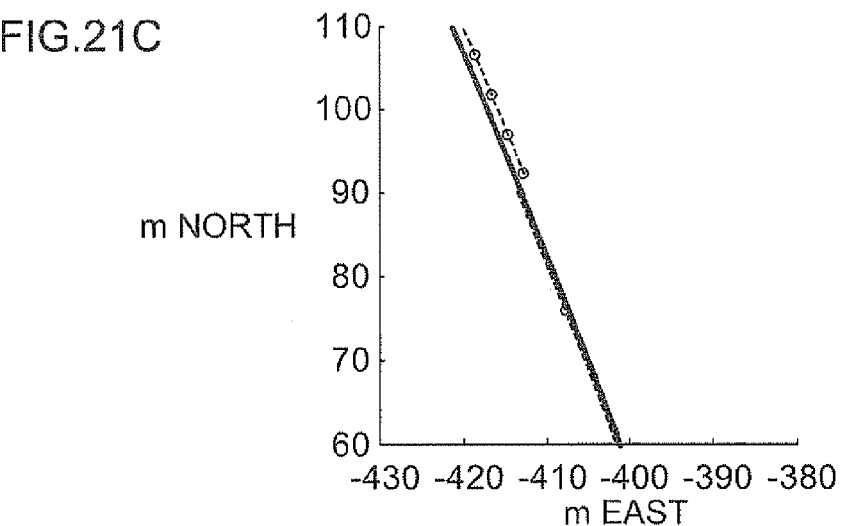
Figure 22:
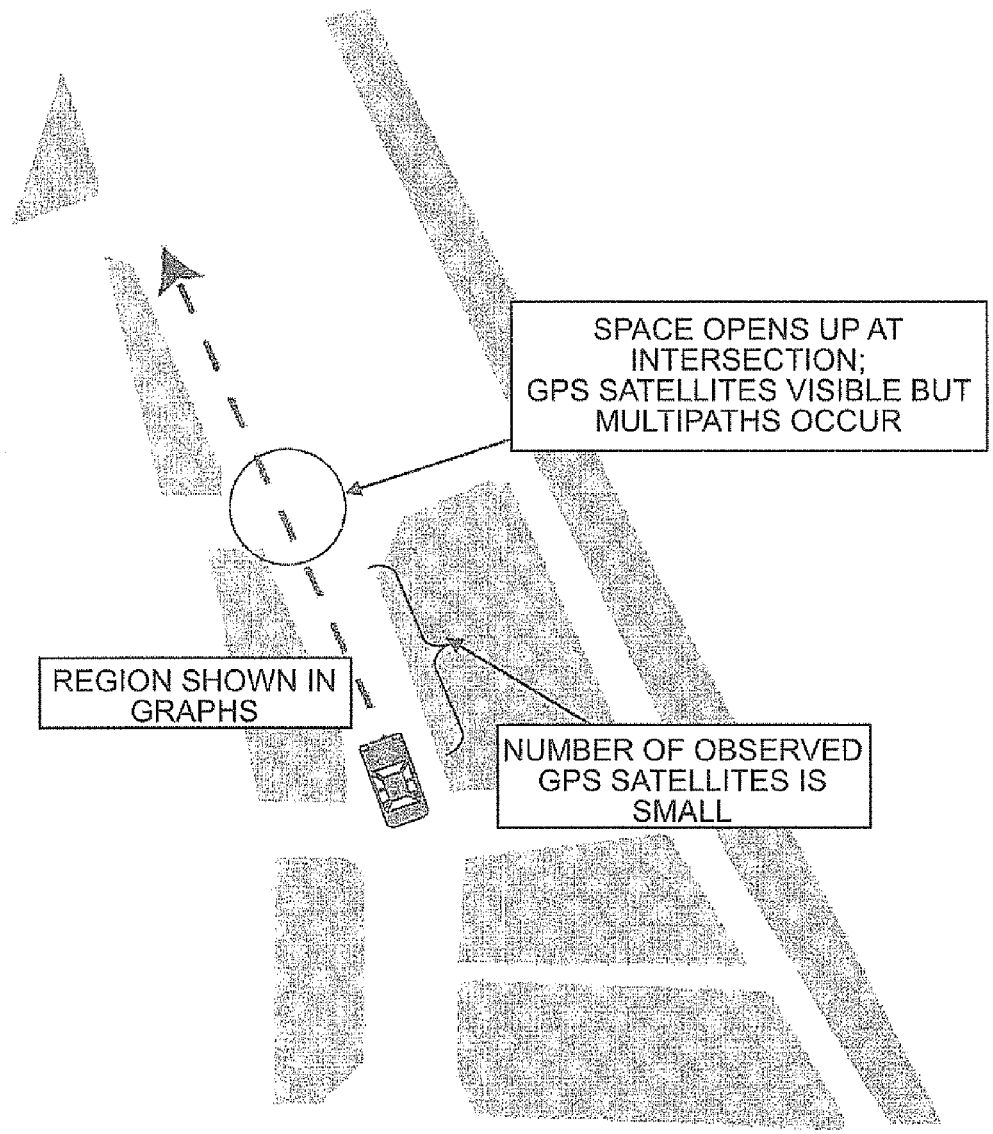
FIG. 22 is a conceptual diagram illustrating a map of an area in which the actual measurements of FIG. 21A to FIG. 21C are performed.

Data that is actually estimated if the distance D is varied between 0.1 m, 1 m and 5 m is illustrated in FIG. 21A to FIG. 21C. FIG. 21A shows the results when optimum position estimation is implemented by bundle adjustment with the distance D set to 0.1 m, FIG. 21B shows the same with the distance D set to 1 m, and FIG. 21C shows the same with the distance D set to 5 m. The solid lines show actual values and the broken lines show position estimation results. Note that, FIG. 22 illustrates a map of the location in which the actual measurements are performed, with the subject region being a straight road with an intersection in the middle. The vehicle travels from the east, and the number of radio waves received from the GPS satellites is small in the region up to the intersection. Therefore, interpolation of the vehicle trajectory is carried out by a provisional estimation section rather than position estimation being performed by bundle adjustment, and consequently differences depending on the distance D are not apparent.

Because the space starts to open up when the vehicle approaches the intersection, the number of satellites that can be captured increases, and multipaths increase correspondingly. Therefore, there is a risk of positioning errors becoming larger. As illustrated in FIG. 21A and FIG. 21B, when the distance D is 1 m or less, multipath errors with the same bias are concentrated, and positioning is performed by the least squares method in a state in which the errors in the observed values do not have randomness. Consequently, in FIG. 21A and FIG. 21B, it is seen that large errors occur. In contrast, as illustrated in FIG. 21C, when the distance D is 5 m, the concentration of multipath errors with the same bias is avoided, and errors in the observed values may be endowed with randomness. Consequently, in FIG. 21C, it is seen that position estimation accuracy is improved.

The vehicle stops at a traffic signal at the intersection. Therefore, if intervals were divided up by time, this would be a state the same as a case in which the distance D is short. In other words, the third exemplary embodiment may reduce a multipath error when positioning is performed by the method of bundle adjustment, by setting the distance D to be long to a certain extent.

As described above, according to the vehicle-mounted position estimation apparatus according to the third exemplary embodiment, when accurately calculated velocity vectors of the vehicle are integrated and pseudo-range data is to be coupled by reference to the calculated trajectory of the vehicle, pseudo-ranges at epoch intervals that are selected such that distances between the receiving positions are at least a predetermined distance are used. In consequence, the third exemplary embodiment may reduce a bias in pseudo-range errors that is caused by multipaths in particular, and may improve the accuracy of position optimization.

In the third exemplary embodiment, the distance D between the points when plural points are being selected from a trajectory is set such that the fineness of the trajectory is coarser than if points on the trajectory are selected at a predetermined time interval (at every epoch). Specifically, based on actual measurement data and empirical values, the distance D may, for example, be set to 5 m. Further, in the third exemplary embodiment, a case in which the distance D is constant is described. However, the distance D may be altered in accordance with conditions around the vehicle, such as information on whether the vehicle is in the town or the countryside, information on heights of buildings in the area, and the like. The distance may also be altered in accordance with the speed of the car.

In the first to third exemplary embodiments, a case of using GPS information from GPS satellites, has been described. However, it is sufficient that information can be acquired from information transmission sources that transmit transmission source information that includes: information relating to positions of the information transmission sources; information relating to distances between the information transmission sources and the mobile object; and information relating to relative velocities of the information transmission sources and the mobile object. For example, information that is transmitted from pseudo-satellites may be received.

Furthermore, in the first to third exemplary embodiments, position estimation apparatus that is mounted at vehicle, has been described. However, moving bodies at which the position estimation apparatus of the present invention is mounted are not limited to vehicles. For example, the position estimation apparatus may be mounted at a robot, or the position estimation apparatus may be configured as a portable terminal that can be carried by a pedestrian.

What is claimed is:

1. A position estimation apparatus mounted at a mobile object, the position estimation apparatus comprising:
    an acquisition section that acquires transmission source information transmitted from each of a plurality of information transmission sources, the transmission source information including, information relating to a position of the each information transmission source, information relating to a distance between the each information transmission source and the mobile object, and information relating to a relative velocity of the mobile object with respect to the each information transmission source;
    a trajectory calculation section that calculates a trajectory of the mobile object by integrating velocity vectors of the mobile object over a predetermined duration, the velocity vectors of the mobile object being obtained on the basis of the transmission source information acquired by the acquisition section; and
    an estimation section that estimates, as a position of the mobile object, a position for which the trajectory of the mobile object calculated by the trajectory calculation section is translated such that a difference between, distances between a plurality of points at different times on the trajectory of the mobile object and the respective information transmission sources, and the acquired distances between the respective information transmission sources and the mobile object, is at a minimum.

2. The position estimation apparatus according to claim 1, wherein the trajectory calculation section:
    calculates a direction of the each information transmission source from the mobile object on the basis of the information relating to the position of the each information transmission source, and a position of the mobile object obtained from the information relating to the distance between the each information transmission source and the mobile object,
    calculates a velocity of the each information transmission source on the basis of a time series of the information relating to the position of the each information transmission source,
    calculates a velocity of the mobile object in the direction of the each information transmission source on the basis of the direction of the each information transmission source from the mobile object, the velocity of the each information transmission source, and the information relating to the relative velocity of the mobile object with respect to the each information transmission source, and
    calculates the velocity vectors of the mobile object on the basis of a plurality of the velocities of the mobile object in the directions of the respective information transmission sources.

3. The position estimation apparatus according to claim 1, wherein the information transmission sources are GPS satellites that transmit:
    satellite navigation information that serves as the information relating to the position of the each information transmission source,
    pseudo-range information that serves as the information relating to the distance between the each information transmission source and the mobile object, and
    a signal from which a Doppler shift frequency information could be measured, the Doppler shift frequency information serves as the information relating to the relative velocity of the mobile object with respect to the each information transmission source.

4. The position estimation apparatus according to claim 2, wherein the information transmission sources are GPS satellites that transmit:
    satellite navigation information that serves as the information relating to the position of the each information transmission source,
    pseudo-range information that serves as the information relating to the distance between the each information transmission source and the mobile object, and
    a signal from which a Doppler shift frequency information could be measured, the Doppler shift frequency information serves as the information relating to the relative velocity of the mobile object with respect to the each information transmission source.

5. The position estimation apparatus according to claim 1, wherein the trajectory calculation section calculates the velocity vectors of the mobile object on the basis of the transmission source information that is acquired by the acquisition section, and mobile object movement information that is detected by a detection section that detects movements of the mobile object.

6. The position estimation apparatus according to claim 2, wherein the trajectory calculation section calculates the velocity vectors of the mobile object on the basis of the transmission source information that is acquired by the acquisition section, and mobile object movement information that is detected by a detection section that detects movements of the mobile object.

7. The position estimation apparatus according to claim 3, wherein the trajectory calculation section calculates the velocity vectors of the mobile object on the basis of the transmission source information that is acquired by the acquisition section, and mobile object movement information that is detected by a detection section that detects movements of the mobile object.

8. The position estimation apparatus according to claim 1, wherein the estimation section selects the plurality of points at different times, such that distances between adjacent the points are separated by at least a predetermined distance.

9. The position estimation apparatus according to claim 2, wherein the estimation section selects the plurality of points at different times, such that distances between adjacent the points are separated by at least a predetermined distance.

10. The position estimation apparatus according to claim 3, wherein the estimation section selects the plurality of points at different times, such that distances between adjacent the points are separated by at least a predetermined distance.

11. The position estimation apparatus according to claim 5, wherein the estimation section selects the plurality of points at different times, such that distances between adjacent the points are separated by at least a predetermined distance.

12. A non-transitory computer readable medium storing a program causing a computer to execute a process for a position estimation of a mobile object, the process comprising:
    acquiring transmission source information transmitted from each of a plurality of information transmission sources, the transmission source information including, information relating to a position of the each information transmission source, information relating to a distance between the each information transmission source and the mobile object, and information relating to a relative velocity of the mobile object with respect to the each information transmission source;

calculating a trajectory of the mobile object by integrating velocity vectors of the mobile object over a predetermined duration, the velocity vectors of the mobile object being obtained on the basis of the acquired transmission source information; and estimating, as the position of the mobile object, a position for which the calculated trajectory of the mobile object is translated such that a difference between, distances between a plurality of points at different times on the trajectory of the mobile object and the respective information transmission sources, and the acquired distances between the respective information transmission sources and the mobile object, is at a minimum.

\* \* \* \* \*